United States Patent
Teramoto et al.

(10) Patent No.: US 12,415,388 B2
(45) Date of Patent: Sep. 16, 2025

(54) TIRE AIR PRESSURE MANAGEMENT SYSTEM, TIRE AIR PRESSURE MANAGEMENT METHOD

(71) Applicant: Sumitomo Rubber Industries, Ltd., Kobe (JP)

(72) Inventors: Masaki Teramoto, Kobe (JP); Kazuharu Tanimura, Kobe (JP); Takahiro Nishimoto, Kobe (JP); Kenji Yoneda, Kobe (JP); Yukinori Hashimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 265 days.

(21) Appl. No.: 18/021,186

(22) PCT Filed: Oct. 13, 2021

(86) PCT No.: PCT/JP2021/037898
§ 371 (c)(1),
(2) Date: Feb. 14, 2023

(87) PCT Pub. No.: WO2022/123898
PCT Pub. Date: Jun. 16, 2022

(65) Prior Publication Data
US 2023/0311591 A1    Oct. 5, 2023

(30) Foreign Application Priority Data
Dec. 11, 2020   (JP) ................. 2020-206256

(51) Int. Cl.
*B60C 23/04* (2006.01)
*B60S 5/04* (2006.01)

(52) U.S. Cl.
CPC ............. *B60C 23/04* (2013.01); *B60S 5/04* (2013.01)

(58) Field of Classification Search
CPC .......................... B60C 23/04–04985
See application file for complete search history.

(56) References Cited

U.S. PATENT DOCUMENTS

| 11,107,104 B1* | 8/2021 | Brannan ............ G06Q 30/0208 |
| 2003/0187556 A1* | 10/2003 | Suzuki ................. H04Q 9/04 |
| | | 701/31.4 |

(Continued)

FOREIGN PATENT DOCUMENTS

| JP | 2004-13449 A | 1/2004 |
| JP | 2005-227976 A | 8/2005 |

(Continued)

OTHER PUBLICATIONS

Office Action issued on Feb. 2, 2021, in corresponding Japanese patent Application No. 2020-206256, 5 pages.

(Continued)

*Primary Examiner* — Anshul Sood
(74) *Attorney, Agent, or Firm* — XSENSUS LLP

(57) ABSTRACT

A tire air pressure management system (100) includes: an acquisition processing portion (61) that acquires an air pressure and an air temperature of a tire (11) attached to a vehicle (1); a correction processing portion (62) that corrects the air pressure that has been acquired by the acquisition processing portion (61) together with the air temperature, based on a difference between the air temperature and a predetermined reference temperature; and a first output processing portion (63) that outputs determination information that is generated based on the air pressure after correction by the correction processing portion (62) and is used to determine whether or not the tire (11) needs air pressure adjustment.

13 Claims, 11 Drawing Sheets

(56) References Cited

U.S. PATENT DOCUMENTS

| | | | | |
|---|---|---|---|---|
| 2012/0143560 A1* | 6/2012 | Tabet | ................... | B60K 15/03 |
| | | | | 702/140 |
| 2013/0185005 A1* | 7/2013 | Petrucelli | .............. | G01M 17/02 |
| | | | | 702/50 |
| 2014/0129076 A1* | 5/2014 | Mouchet | ............ | B60C 23/0479 |
| | | | | 701/1 |
| 2017/0096037 A1* | 4/2017 | Smith | ................ | B60C 23/0488 |
| 2017/0129294 A1* | 5/2017 | Taki | ................... | B60C 23/0476 |
| 2020/0215859 A1* | 7/2020 | Horikoshi | ........... | B60C 23/0486 |
| 2020/0298635 A1 | 9/2020 | Suzuki et al. | | |
| 2021/0001810 A1* | 1/2021 | Rivard | ................ | G06V 40/172 |
| 2022/0063357 A1* | 3/2022 | Singh | ................ | B60C 23/0457 |
| 2023/0351824 A1* | 11/2023 | Iizuka | ..................... | G07C 5/10 |

FOREIGN PATENT DOCUMENTS

| | | |
|---|---|---|
| JP | 2010-254240 A | 11/2010 |
| JP | 2012-218582 A | 11/2012 |
| JP | 2013-252777 A | 12/2013 |
| JP | 2018-47849 A | 3/2018 |
| JP | 2019-123482 A | 7/2019 |
| JP | 2019/155712 A | 8/2019 |

OTHER PUBLICATIONS

International Search Report mailed on Dec. 7, 2021, received for PCT Application PCT/JP2021/037898 filed on Oct. 13, 2021, 12 pages including English Translation.

* cited by examiner

TIRE AIR PRESSURE MANAGEMENT SYSTEM, TIRE AIR PRESSURE MANAGEMENT METHOD

CROSS-REFERENCE TO RELATED APPLICATIONS

The present application is a 371 PCT filing of PCT/JP2021/037898, filed Oct. 13, 2021, which claims priority from JP 2020-206256, filed Dec. 11, 2020, where the entire contents of each are incorporated herein by reference.

TECHNICAL FIELD

The present disclosure relates to a tire air pressure management system and a tire air pressure management method.

BACKGROUND ART

There is known a system that detects air pressures of pneumatic tires (hereinafter, merely referred to as "tires") attached to a vehicle such as an automobile, and outputs the detection results. For example, there is known a system that, upon an arrival of a predetermined output timing, outputs air pressures of the tires of the vehicle that were detected when an engine of the vehicle was ignited (see PTL 1).

CITATION LIST

Patent Literature

[PTL 1] Japanese Patent Application Publication No. 2018-47849

SUMMARY OF THE INVENTION

Problems to be Solved by the Invention

Meanwhile, after a rental vehicle, such as a rental car, is returned, air pressures of tires of the rental vehicle are measured, as a part of inspection work on the returned rental vehicle. Subsequently, when a measured air pressure is out of a predetermined range, the air pressure of the tire is adjusted.

If, when the rental vehicle is returned, it is possible to output the air pressures of the tires of the rental vehicle at the time of returning, it will reduce a work load for the inspection work on the returned rental vehicle.

However, at the time of returning, the air pressures of the tires of the rental vehicle have temporarily increased due to increase of temperatures of the tires caused by the vehicle having run until it is returned. As a result, if, when the rental vehicle is returned, the air pressures of the tires of the rental vehicle at the time of returning are output as they are, the determination on whether or not the tires need air pressure adjustment will be made erroneously.

It is therefore an object of the present disclosure to provide a tire air pressure management system and a tire air pressure management method that can reduce a work load for an inspection work on a vehicle.

Solution to the Problems

A tire air pressure management system according to an aspect of the present disclosure includes an acquisition processing portion, a correction processing portion, and a first output processing portion. The acquisition processing portion acquires an air pressure inside a pneumatic tire attached to a vehicle, and an air temperature inside the pneumatic tire. The correction processing portion corrects the air pressure that has been acquired by the acquisition processing portion together with the air temperature, based on a difference between the air temperature and a predetermined reference temperature. The first output processing portion outputs determination information that is generated based on the air pressure after correction by the correction processing portion and is used to determine whether or not the pneumatic tire needs air pressure adjustment.

With the above-described configuration, it is possible to eliminate the need of an inspection work on the air pressure of the tire by a worker who performs an inspection work on the vehicle, by transmitting the output determination information to the worker. It is thus possible to reduce a work load of the worker performing the inspection work on the vehicle.

Advantageous Effects of the Invention

According to the present disclosure, it is possible to reduce a work load for an inspection work on a vehicle.

DESCRIPTION OF EMBODIMENTS

The following describes embodiments of the present disclosure with reference to the accompanying drawings. It should be noted that the following embodiments are examples of specific embodiments of the present disclosure and should not limit the technical scope of the present disclosure.

First Embodiment

Figure 1:
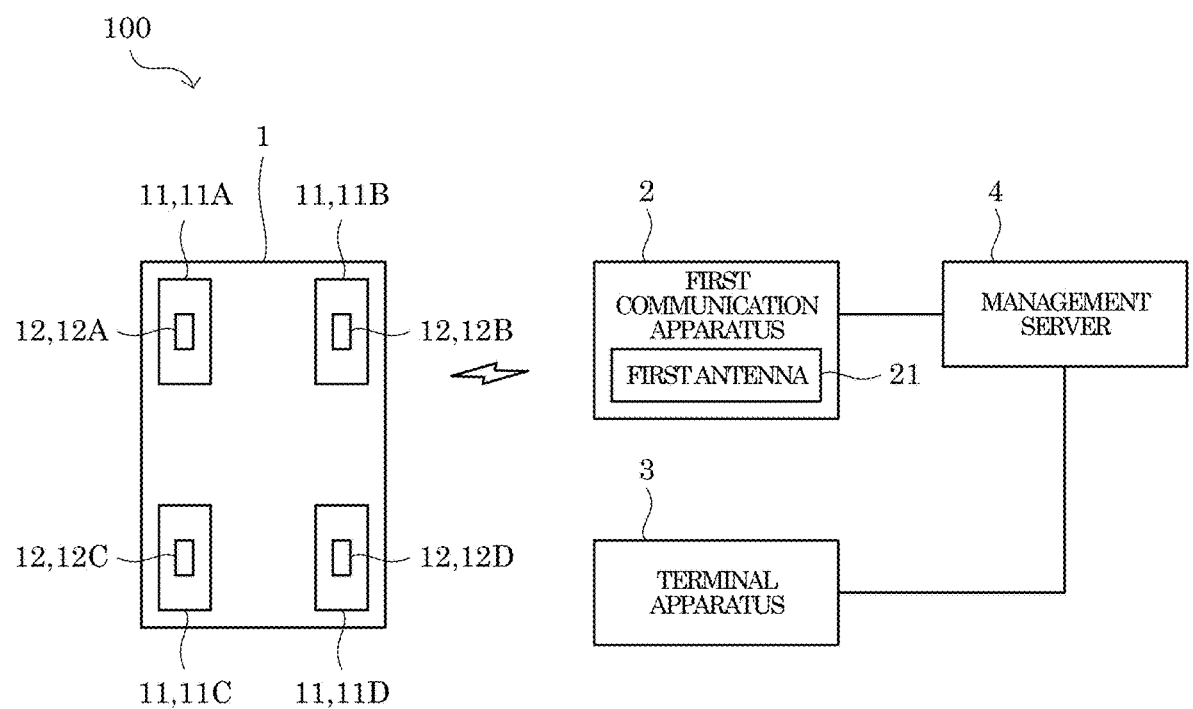
FIG. 1 is a diagram showing a configuration of a tire air pressure management system according to a first embodiment of the present disclosure.

First, with reference to FIG. 1, a description is given of a configuration of a tire air pressure management system 100 according to a first embodiment of the present disclosure.

As shown in FIG. 1, the tire air pressure management system 100 includes a vehicle 1, a first communication apparatus 2, a terminal apparatus 3, and a management server 4.

In the tire air pressure management system 100, the management server 4 is connected so as to mutually communicate with the first communication apparatus 2 and the terminal apparatus 3 via a communication network such as the Internet or a LAN (Local Area Network).

The vehicle 1 is a rental vehicle that is rented out to a predetermined user. For example, the vehicle 1 is a rental car that is rented out by a rental car business agent. It is noted that the vehicle 1 may be a shared car that is rented out by a business agent providing a car sharing service.

The vehicle 1 is rented out at a predetermined office of the rental car business agent, and returned to the office. That is, the office is a rent-out place where the vehicle 1 is rented out, and also a return place where the vehicle 1 is returned. It is noted that the rent-out place of the vehicle 1 may be another office that is different from the return place of the vehicle 1.

As shown in FIG. 1, the vehicle 1 includes four pneumatic tires (hereinafter, merely referred to as "tires") 11. Of the four tires 11, a tire 11A is attached to a front-left wheel of the vehicle 1. In addition, a tire 11B is attached to a front-right wheel of the vehicle 1. In addition, a tire 11C is attached to a rear-left wheel of the vehicle 1. In addition, a tire 11D is attached to a rear-right wheel of the vehicle 1.

As shown in FIG. 1, the vehicle 1 includes four air pressure detection devices 12. Of the four air pressure detection devices 12, an air pressure detection device 12A is provided in the tire 11A. In addition, an air pressure detection device 12B is provided in the tire 11B. In addition, an air pressure detection device 12C is provided in the tire 11C. In addition, an air pressure detection device 12D is provided in the tire 11D.

Each of the air pressure detection devices 12 includes a sensor that detects an air pressure and an air temperature in the tire 11 in which that air pressure detection device 12 is provided. In addition, each of the air pressure detection devices 12 includes a transmitter and an antenna for transmitting the detection result of the sensor to outside. Each of the air pressure detection devices 12 is an example of a detection portion of the present disclosure.

Specifically, the air pressure detection device 12 executes a wireless communication according to a predetermined first wireless communication standard, with the first communication apparatus 2 (see FIG. 1) that is located in a communication range of the first wireless communication standard from the air pressure detection device 12. For example, the first wireless communication standard is IEEE that is well known as an international standard, or a wireless communication standard conforming to IEEE. For example, the first wireless communication standard is Bluetooth or Wi-Fi. In this case, the air pressure detection device 12 can execute wireless communication with the first communication apparatus 2 that is located in a range of over ten meters. It is noted that the first wireless communication standard may be a standard that is different from Bluetooth and Wi-Fi.

The air pressure detection device 12 transmits, to the first communication apparatus 2, detection data that includes detection results of the sensor. The detection data includes detection device identification information, air pressure information, air temperature information and the like, wherein the detection device identification information is used to identify the air pressure detection device 12, the air pressure information indicates the air pressure inside the tire 11 detected by the sensor, and the air temperature information indicates the air temperature inside the tire 11 detected by the sensor.

For example, the air pressure detection device 12, when it can execute a wireless communication according to the first wireless communication standard with the first communication apparatus 2, executes a detection process and a transmission process at a predetermined execution cycle. In the detection process, the air pressure and the air temperature of the tire 11 are detected by using the sensor. In the transmission process, the detection data that includes the detection results of the detection process is transmitted to the first communication apparatus 2. For example, the execution cycle is an arbitrarily determined time between 10 (ten) seconds and 10 (ten) minutes. It is noted that the air pressure detection device 12 may execute the detection process and the transmission process upon receiving an execution instruction transmitted from the management server 4 via the first communication apparatus 2.

The first communication apparatus 2 receives the detection data transmitted from the air pressure detection devices 12, and transmits the received detection data to the management server 4. The first communication apparatus 2 is installed at each office. The first communication apparatus 2 is an example of a communication portion of the present disclosure.

As shown in FIG. 1, the first communication apparatus 2 includes a first antenna 21. The first antenna 21 is used for wireless communication with the air pressure detection devices 12. The first communication apparatus 2 executes a wireless communication according to the first wireless communication standard with the air pressure detection device 12 that is located in a communication range of the first wireless communication standard from the first antenna 21.

Upon receiving the detection data from an air pressure detection device 12, the first communication apparatus 2 adds first additional data to the received detection data. Subsequently, the first communication apparatus 2 transmits the detection data added with the first additional data to the management server 4. The first additional data includes: reception date/time information indicating the date and the time at which the detection data was received; and office identification information that is used for identifying the office.

The terminal apparatus 3 is an information processing apparatus that is used by employees at the office. For example, the terminal apparatus 3 is a personal computer installed in the office. It is noted that the terminal apparatus 3 may be a smartphone, a tablet terminal or the like used by an employee at the office.

The management server 4 executes, based on the detection data, various processes regarding the management of the air pressure of the tires 11.

[Configuration of Management Server 4]

Next, a configuration of the management server 4 is described with reference to FIG. 2.

Figure 2:
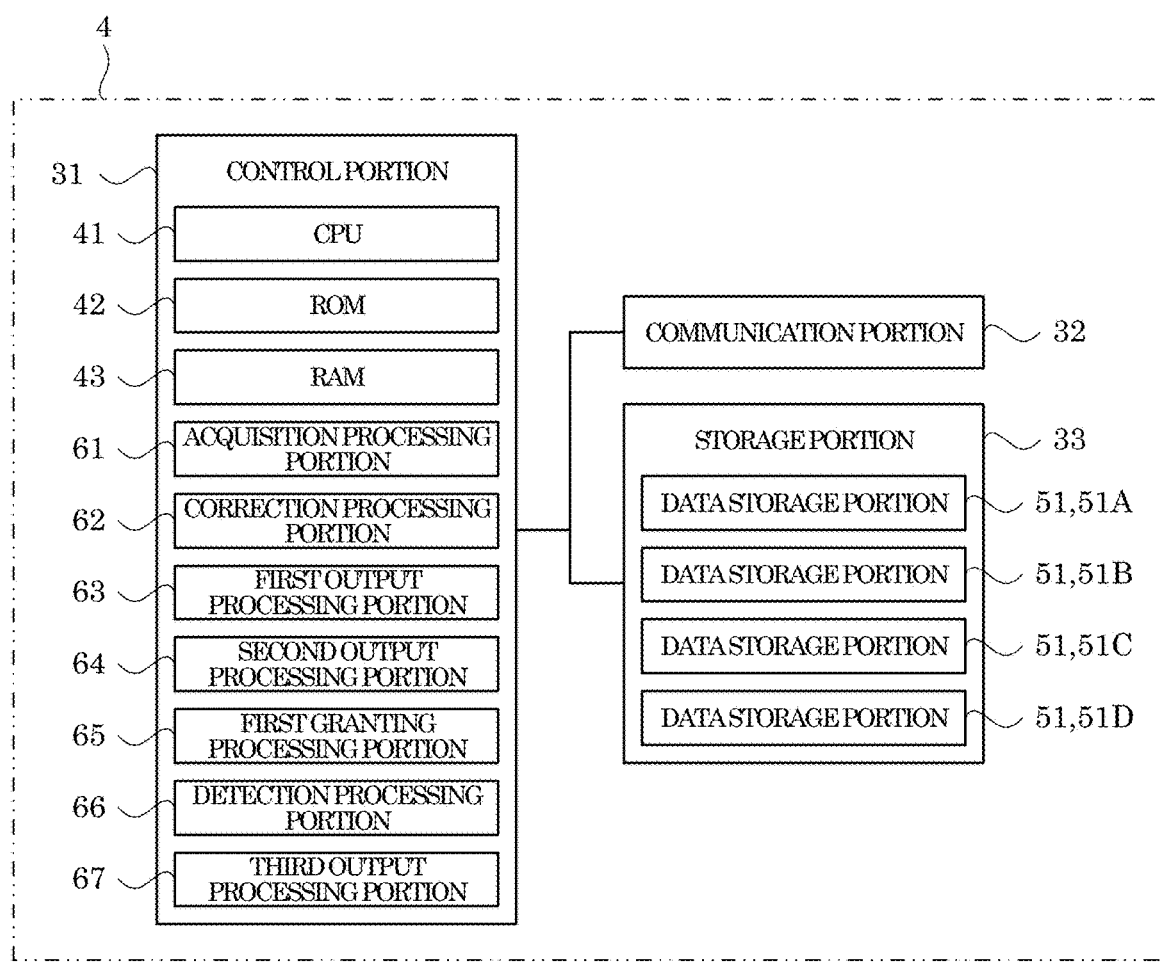
FIG. 2 is a diagram showing a configuration of a management server of the tire air pressure management system according to the first embodiment of the present disclosure.

As shown in FIG. 2, the management server 4 includes a control portion 31, a communication portion 32, and a storage portion 33.

The control portion 31 comprehensively controls the management server 4. As shown in FIG. 2, the control portion 31 includes a CPU 41, a ROM 42, and a RAM 43. The CPU 41 is a processor that executes various types of calculation processes. The ROM 42 is a nonvolatile storage device in which are preliminarily stored various types of information such as control programs for causing the CPU 41 to execute various processes. The RAM 43 is a volatile or nonvolatile storage device that is used as a temporary storage memory (working area) for the various types of processes executed by the CPU 41. In the control portion 31, the CPU 41 executes the various types of control programs that are preliminarily stored in the ROM 42. This allows the control portion 31 to comprehensively control the management server 4.

The communication portion 32 is a communication interface configured to perform wired or wireless data communication with external communication apparatuses such as the first communication apparatus 2, via the communication network.

The storage portion 33 is a nonvolatile storage device. For example, the storage portion 33 is a storage device such as: a nonvolatile memory such as a flash memory or an EEPROM; an SSD (Solid State Drive); or an HDD (Hard Disk Drive).

In the storage portion 33, vehicle information for each vehicle 1 is preliminarily stored. The vehicle information is information regarding the vehicle 1. The vehicle information includes: vehicle identification information used for identifying the vehicle 1; an automobile registration number of the vehicle 1; information such as a type, a color, and a size of the vehicle 1; the detection device identification information of the air pressure detection devices 12 respectively corresponding to the tires 11 attached to the vehicle 1; and tire information of the tires 11 attached to the vehicle 1. The tire information is information regarding each of the tires 11. The tire information includes a type, a size, and a manufacture timing of the tire 11.

In addition, as shown in FIG. 2, the storage portion 33 includes four data storage portions 51. The four data storage portions 51 are provided for each piece of the vehicle identification information preliminarily registered in the management server 4.

Of the four data storage portions 51, a data storage portion 51A is a storage area of the storage portion 33 that is used to store the detection data corresponding to the tire 11A. In addition, a data storage portion 51B is a storage area of the storage portion 33 that is used to store the detection data corresponding to the tire 11B. In addition, a data storage portion 51C is a storage area of the storage portion 33 that is used to store the detection data corresponding to the tire 11C. In addition, a data storage portion 51D is a storage area of the storage portion 33 that is used to store the detection data corresponding to the tire 11D.

Upon receiving a piece of detection data from the first communication apparatus 2, the control portion 31 determines a place to store the received piece of detection data. Specifically, the control portion 31 determines one of the data storage portions 51 as a place to store the received piece of detection data, based on the detection device identification information included in the received piece of detection data, and the vehicle information stored in the storage portion 33. Subsequently, the control portion 31 stores the received piece of detection data in the data storage portion 51 determined as the place to store it.

Here, according to the tire air pressure management system 100 of the first embodiment of the present disclosure, it is possible to reduce a work load of an employee at the office who performs an inspection work on the vehicle 1 when the vehicle 1 is returned to the office.

Specifically, as shown in FIG. 2, the control portion 31 includes an acquisition processing portion 61, a correction processing portion 62, and a first output processing portion 63. For example, the control portion 31 functions as the acquisition processing portion 61, the correction processing portion 62, and the first output processing portion 63 by executing an air pressure management program preliminarily stored in the storage portion 33. It is noted that a part or all of processing portions included in the control portion 31 may be composed of an electronic circuit. In addition, the air pressure management program may be a program for causing a plurality of processors to function as the various types of processing portions.

The acquisition processing portion 61 acquires the air pressure and the air temperature inside the tire 11 attached to the vehicle 1.

Specifically, the acquisition processing portion 61 acquires the air pressure and the air temperature of the tires 11 at a first timing when the vehicle 1 stops in a predetermined first specific range.

Here, the first specific range corresponds to the office that is the return place of the vehicle 1.

For example, the first specific range is the communication range of the wireless communication performed by the first communication apparatus 2 installed at the office, according to the first wireless communication standard.

In this case, the acquisition processing portion 61 determines whether or not the vehicle 1 has stopped in the first specific range, based on whether or not the communication by the first communication apparatus 2 with the air pressure detection device 12 has been established. For example, when a communication by the first communication apparatus 2 with the air pressure detection device 12 is established, and the communication continues for over a predetermined first determination time period, the acquisition processing portion 61 determines that the vehicle 1 has stopped in the first specific range. It is noted that the acquisition processing portion 61 can determine whether or not the communication between the air pressure detection device 12 and the first communication apparatus 2 is established and continued, based on the communication state of the detection data from the first communication apparatus 2.

For example, upon arrival of the first timing, the acquisition processing portion 61 acquires the air pressure and the air temperature of the tire 11 for each of the four tires 11. Specifically, the acquisition processing portion 61 acquires, from each of the data storage portions 51, the air pressure information and the temperature information included in detection data having the latest piece of reception date/time information. It is noted that the acquisition processing portion 61 may acquire the air pressure and the air temperature of the tire 11 for one or more of the four tires 11.

It is noted that a magnetic sensor configured to detect the vehicle 1 in a predetermined stop area in the office may be installed in the office. In this case, the first specific range may be the stop area. In addition, the acquisition processing portion 61 may use the magnetic sensor to determine whether or not the vehicle 1 has stopped in the first specific area.

The correction processing portion 62 corrects the air pressure of the tire 11 that is acquired by the acquisition processing portion 61 together with the air temperature, based on a difference between the air temperature and a predetermined reference temperature.

For example, the reference temperature is determined based on an average temperature of a day at the location of the office. In this case, the reference temperature is updated at a predetermined update cycle such as a monthly cycle. It is noted that the reference temperature may not change throughout the year or may be determined for each season.

For example, correspondence relationship information is preliminarily stored in the storage portion 33, the correspondence relationship information indicating correspondence relationship between: the difference between the air temperature of the tire 11 and the reference temperature; and a correction value used to correct the air pressure of the tire 11. For example, the correspondence relationship information is a formula or table data.

In this case, the correction processing portion 62 uses the correspondence relationship information to acquire a correction value that corresponds to the difference between the air temperature of the tire 11 acquired by the acquisition processing portion 61 and the reference temperature. Subsequently, the correction processing portion 62 corrects the air pressure by adding the acquired correction value to the air pressure of the tire 11 acquired by the acquisition processing portion 61.

For example, each time the acquisition processing portion 61 acquires the air pressure and the air temperature of the tire 11, the correction processing portion 62 corrects the air pressure. Subsequently, the correction processing portion 62 adds corrected air pressure information that indicates the air pressure after correction, to the detection data, stored in the data storage portions 51, that includes the air pressure before correction.

The first output processing portion 63 outputs determination information that is generated based on the air pressure after the correction by the correction processing portion 62 and is used to determine whether or not the tire 11 needs air pressure adjustment.

Specifically, the first output processing portion 63 outputs the determination information that is generated based on a first corrected air pressure that is the air pressure acquired at the first timing and corrected by the correction processing portion 62.

For example, the determination information includes first determination information and second determination information, wherein the first determination information indicates that the tire 11 does not need air pressure adjustment, and the second determination indicates that the tire 11 needs air pressure adjustment.

In this case, when the first corrected air pressure exceeds a predetermined first threshold, the first output processing portion 63 outputs the first determination information. In addition, when the first corrected air pressure is equal to or lower than the first threshold, the first output processing portion 63 outputs the second determination information.

For example, when the first timing has arrived, the first output processing portion 63 outputs the determination information for each of the four tires 11.

For example, the first output processing portion 63 outputs the determination information to a display portion of the terminal apparatus 3. This allows the employees at the office to omit the inspection work on the air pressure of the tires 11 when the vehicle 1 is returned to the office.

It is noted that the determination information may be information not including the result of the determination by the control portion 31 on whether or not the tire 11 needs air pressure adjustment. For example, the determination information may merely notify the first corrected air pressure.

In addition, the first output processing portion 63 may transmit an electronic mail including the determination information to an electronic mail address of the user preliminarily registered in the management server 4.

In addition, in the tire air pressure management system 100 according the first embodiment, it is possible to urge the user to adjust the air pressure of the tire 11 before the vehicle 1 is returned to the office.

Specifically, the acquisition processing portion 61 acquires the air pressure and the air temperature of the tire 11 at a second timing when the vehicle 1 moves out of a predetermined second specific range.

Here, the second specific range corresponds to the office that is the rent-out place of the vehicle 1.

For example, the second specific range is the same as the first specific range. That is, the second specific range is the communication range of the wireless communication performed according to the first wireless communication standard by the first communication apparatus 2 installed at the office.

In this case, the acquisition processing portion 61 determines whether or not the vehicle 1 has moved out of the second specific range, based on whether or not a communication by the first communication apparatus 2 with the air pressure detection device 12 has been established. For example, when a communication between the first communication apparatus 2 and the air pressure detection device 12 is interrupted, and the communication interruption state continues for over a predetermined second determination time period, the acquisition processing portion 61 determines that the vehicle 1 has moved out of the second specific range.

For example, upon arrival of the second timing, the acquisition processing portion 61 acquires the air pressure and the air temperature of the tire 11 for each of the four tires 11. Specifically, the acquisition processing portion 61 acquires, from each of the data storage portions 51, the air pressure information and the temperature information included in detection data having the latest piece of reception date/time information.

It is noted that when the rent-out place of the vehicle 1 is another office that is different from the return place of the vehicle 1, the second specific range is different from the first specific range.

In addition, as shown in FIG. 2, the control portion 31 includes a second output processing portion 64 and a first granting processing portion 65. For example, the control portion 31 functions as the second output processing portion 64 and the first granting processing portion 65 by executing the air pressure management program.

When a second corrected air pressure that is the air pressure acquired at the second timing and corrected by the correction processing portion 62, is equal to or lower than a predetermined first reference value, the second output processing portion 64 outputs first notification information that includes an indication of the fact.

For example, the first reference value is the same value as the first threshold. It is noted that the first reference value may be different from the threshold.

For example, the first notification information includes: an indication that there is a tire 11 for which the second corrected air pressure is equal to or lower than the first reference value; information indicating an attachment position of the tire 11; and an indication that air pressure adjustment of the tire 11 is requested.

For example, when the second timing has arrived, the second output processing portion 64 determines, for each of the four tires 11, whether or not the second corrected air pressure is equal to or lower than the first reference value. Upon determining, for one or more of the four tires 11, that the second corrected air pressure is equal to or lower than the first reference value, the second output processing portion 64 outputs the first notification information. It is noted that the second output processing portion 64 may determine, for one or more of the four tires 11, whether or not the second corrected air pressure is equal to or lower than the first reference value.

For example, the second output processing portion 64 transmit an electronic mail including the first notification information to an electronic mail address of the user preliminarily registered in the management server 4. This makes it possible to urge the user to adjust the air pressure of the tire 11.

It is noted that the first notification information may not include one or more of: the indication that there is a tire 11 for which the second corrected air pressure is equal to or lower than the first reference value; the information indicating the attachment position of the tire 11; and the indication that air pressure adjustment of the tire 11 is requested.

When a predetermined first granting condition is satisfied, the first granting processing portion 65 grants a predetermined first privilege to the user.

Specifically, the first granting condition is that the first corrected air pressure that is acquired at the first timing that arrives after the first notification information is output, exceeds the first reference value.

For example, the first privilege is a first coupon that is used to reduce a rental fee of the vehicle 1.

Specifically, when the first timing has arrived after the first notification information was output, the first granting processing portion 65 determines, for each of the tires 11 for which it was determined that the second corrected air pressure is equal to or lower than the first reference value, whether or not the first corrected air pressure exceeds the first reference value. Upon determining, for a part or all of the tires 11 for which it was determined that the second corrected air pressure is equal to or lower than the first reference value, that the first corrected air pressure exceeds the first reference value, the first granting processing portion 65 grants the first privilege to the user.

For example, the first granting processing portion 65 transmit an electronic mail including the first coupon to the electronic mail address of the user preliminarily registered in the management server 4. This makes it possible to more strongly urge the driver of the vehicle 1 to adjust the air pressure of the tire 11.

It is noted that the first privilege may be a point(s) of a point service provided by the rental car business agent. In this case, point information may be preliminarily stored in the storage portion 33, wherein the point information indicates the number of points owned by the user. In addition, the first granting processing portion 65 may grant the point(s) to the user by rewriting the point information. In addition, the first privilege is not limited to the first coupon or the point(s), but may be any economic benefits or right that is granted to the user.

In addition, in the tire air pressure management system 100 according the first embodiment, it is possible to detect abnormality of the tire 11 when the vehicle 1 is rented out to the user.

Specifically, as shown in FIG. 2, the control portion 31 includes a detection processing portion 66 and a third output processing portion 67. For example, the control portion 31 functions as the detection processing portion 66 and the third output processing portion 67 by executing the air pressure management program.

The detection processing portion 66 detects abnormality of the tire 11 based on: the second corrected air pressure acquired at the second timing; and the first corrected air pressure acquired at the first timing closest to the second timing. It is noted that the abnormality mentioned here is related to the speed at which the air pressure of the tire 11 decreases.

For example, the detection processing portion 66 detects the abnormality when a decrease speed of the air pressure that is acquired based on the first corrected air pressure and the second corrected air pressure, exceeds a predetermined second threshold. Here, the second threshold is a value that is used to determine whether or not the decrease speed of the air pressure of the tire 11 is higher than the decrease speed of the air pressure of a normal tire.

For example, the detection processing portion 66 acquires the decrease speed by dividing a difference between the first corrected air pressure and the second corrected air pressure by an elapsed time from the first timing to the second timing. It is noted that the first corrected air pressure can be acquired from the data storage portion 51.

For example, when the second timing has arrived, the detection processing portion 66 determines, for each of the four tires 11, whether or not the abnormality is present. It is noted that the detection processing portion 66 may determine, for one or more of the four tires 11, whether or not the abnormality is present.

When the detection processing portion 66 has detected the abnormality, the third output processing portion 67 outputs second notification information that includes an indication of the fact.

For example, the second notification information includes: degree information that indicates a degree of the abnormality that is based on a difference between the decrease speed and the second threshold; and a message that tire replacement is necessary. In addition, the second notification information includes information that indicates an attachment position of the tire 11 for which the abnormality was detected.

For example, the degree information indicates the degree of the abnormality by five levels from "1" (the lightest) to "5" (the heaviest). The numerical value of the degree information increases as the difference between the decrease speed and the second threshold becomes larger.

For example, the third output processing portion 67 outputs, together with the second notification information, size information and type information, wherein the size information indicates the size of the tire 11, and the type information indicates the type of the tire 11. Here, the type information indicates a manufacturer name, a product name, or the like of the tire 11. The size information and the type information are included in the vehicle information that is preliminarily stored in the storage portion 33.

For example, the third output processing portion 67 transmit an electronic mail including the second notification information, the size information, and the type information, to an electronic mail address of the user preliminarily registered in the management server 4. This makes it possible to urge the user to take actions such as stopping using the vehicle 1, performing tire replacement, or the like.

In addition, the third output processing portion 67 outputs the second notification information, the size information, and the type information to the display portion of the terminal apparatus 3. This makes it possible to urge the employees at the office to take actions such as stopping the rental of the vehicle 1.

It is noted that the third output processing portion 67 may output, together with the second notification information, only one of the size information and the type information. In addition, the third output processing portion 67 may output only the second notification information. In addition, the second notification information may not include one or more of: the degree information; the message; and the information indicating an attachment position of the tire 11 for which the abnormality was detected.

It is noted that after an arrival of the first timing, the acquisition processing portion 61 may acquire the air pressure and the air temperature of the tire 11 at a predetermined acquisition cycle. In this case, the detection processing portion 66 may detect the abnormality based on: the first corrected air pressure acquired at the first timing; and an air pressure that is acquired after the arrival of the first timing and corrected by the correction processing portion 62. In addition, when the abnormality has been detected by the detection processing portion 66, the third output processing portion 67 may output the second notification information to the display portion of the terminal apparatus 3.

[First Air Pressure Management Process]

In the following, with reference to FIG. 3, a description is given of an example of the procedure of a first air pressure management process executed by the control portion 31 of the management server 4 in the tire air pressure management system 100, as well as a tire air pressure management method of the present disclosure. Here, steps S11, S12, . . . represent numbers assigned to the processing procedures (steps) executed by the control portion 31.

<Step S11>

First, in step S11, the control portion 31 determines whether or not the second timing has arrived. Here, the process of step S11 is executed by the acquisition processing portion 61 of the control portion 31.

Here, upon determining that the second timing has arrived (Yes side at step S11), the control portion 31 moves the process to step S12. In addition, upon determining that the second timing has not arrived (No side at step S11), the control portion 31 waits, at step S11, for the second timing to arrive.

<Step S12>

In step S12, the control portion 31 acquires the air pressure and the air temperature for each of the tires 11. Here, the process of step S12 is executed by the acquisition processing portion 61 of the control portion 31.

<Step S13>

In step S13, the control portion 31 corrects the air pressure of each of the tires 11 acquired in step S12. Here, the process of step S13 is executed by the correction processing portion 62 of the control portion 31.

<Step S14>

In step S14, the control portion 31 determines, for each of the tires 11, whether or not the abnormality has been detected. Here, the process of step S14 is executed by the detection processing portion 66 of the control portion 31.

Specifically, the control portion 31 detects the abnormality of the tire 11 based on: the second corrected air pressure acquired in step S13; and the first corrected air pressure acquired at the closest first timing.

Here, upon determining, for one or more of the tires 11, that the abnormality has been detected (Yes side at step S14), the control portion 31 moves the process to step S17. In addition, upon determining, for each of the tires 11, that the abnormality has not been detected (No side at step S14), the control portion 31 moves the process to step S15.

<Step S15>

In step S15, the control portion 31 determines, for each of the tires 11, whether or not the second corrected air pressure acquired in step S13 is equal to or lower than the first reference value.

Here, upon determining, for one or more of the tires 11, that the second corrected air pressure is equal to or lower than the first reference value (Yes side at step S15), the control portion 31 moves the process to step S16. In addition, upon determining, for each of the tires 11, that the second corrected air pressure is not equal to or lower than the first reference value (No side at step S15), the control portion 31 moves the process to step S18.

<Step S16>

In step S16, the control portion 31 outputs the first notification information that includes an indication that the second corrected air pressure acquired in step S13 is equal to or lower than the first reference value. Here, the process of step S16 is executed by the second output processing portion 64 of the control portion 31.

For example, the control portion 31 transmits an electronic mail including the first notification information to an electronic mail address of the user preliminarily registered in the management server 4.

<Step S17>

In step S17, the control portion 31 outputs the second notification information that includes an indication that the abnormality was detected in step S14. Here, the process of step S17 is executed by the third output processing portion 67 of the control portion 31.

For example, the control portion 31 transmits an electronic mail including the second notification information, the size information, and the type information, to an electronic mail address of the user preliminarily registered in the management server 4. In addition, the control portion 31 outputs the second notification information, the size information, and the type information to the display portion of the terminal apparatus 3.

<Step S18>

In step S18, the control portion 31 executes a first determination information output process that is described in the following.

[First Determination Information Output Process]

Figure 4:
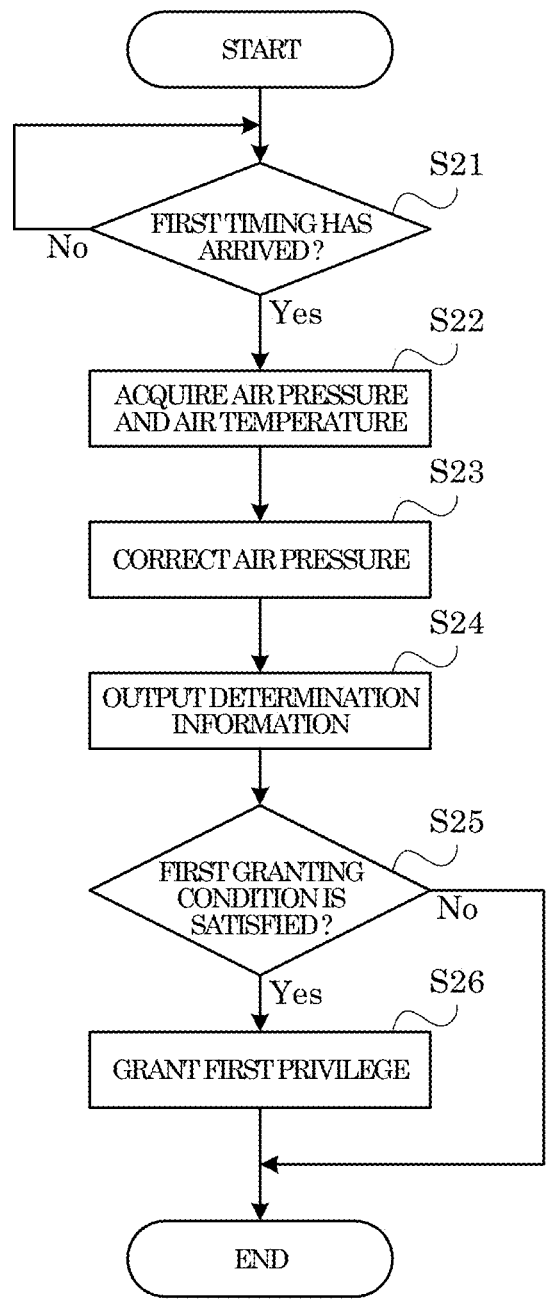
FIG. 4 is a flowchart showing an example of a first determination information output process executed by the management server of the tire air pressure management system according to the first embodiment of the present disclosure.

Next, with reference to FIG. 4, a description is given of an example of the procedure of the first determination information output process that is executed in step S18 of the first air pressure management process.

<Step S21>

First, in step S21, the control portion 31 determines whether or not the first timing has arrived. Here, the process of step S21 is executed by the acquisition processing portion 61 of the control portion 31.

Here, upon determining that the first timing has arrived (Yes side at step S21), the control portion 31 moves the process to step S22. In addition, upon determining that the first timing has not arrived (No side at step S21), the control portion 31 waits, at step S21, for the first timing to arrive.

\<Step S22\>

In step S22, the control portion 31 acquires the air pressure and the air temperature for each of the tires 11. Here, the process of step S22 is an example of an acquisition step of the present disclosure, and is executed by the acquisition processing portion 61 of the control portion 31.

\<Step S23\>

In step S23, the control portion 31 corrects the air pressure of each of the tires 11 acquired in step S22. Here, the process of step S23 is an example of a correction step of the present disclosure, and is executed by the correction processing portion 62 of the control portion 31.

\<Step S24\>

In step S24, the control portion 31 outputs the determination information for each of the tires 11. Here, the process of step S24 is an example of an output step of the present disclosure, and is executed by the first output processing portion 63 of the control portion 31.

\<Step S25\>

In step S25, the control portion 31 determines whether or not the first granting condition is satisfied.

Here, upon determining that the first granting condition is satisfied (Yes side at step S25), the control portion 31 moves the process to step S26. In addition, upon determining that the first granting condition is not satisfied (No side at step S25), the control portion 31 ends the first determination information output process.

\<Step S26\>

In step S26, the control portion 31 grants the first privilege to the user. Here, the process of step S26 is executed by the first granting processing portion 65 of the control portion 31.

As described above, in the tire air pressure management system 100, the air pressure and the air temperature of the tire 11 are acquired, and the air pressure is corrected based on the air temperature acquired together with the air pressure. Subsequently, the determination information generated based on the first corrected air pressure that is the air pressure after the correction, is output to the terminal apparatus 3. This eliminates the need for the employees at the office to inspect the air pressure of the tires 11. It is thus possible to reduce a work load of the employees who perform the inspection work on the vehicle 1.

In addition, in the tire air pressure management system 100, the determination information is output based on the air pressure and the air temperature of the tire 11 that are acquired at the first timing when the vehicle 1 stops in the first specific range. This makes it possible to output the determination information that is based on the air pressure at a timing immediately before the inspection work on the vehicle 1 is performed. It is thus possible to increase the accuracy of the determination on whether or not air pressure adjustment of the tires 11 is necessary.

In addition, in the tire air pressure management system 100, the determination information includes the first determination information and the second determination information, the first determination information indicating that the tire 11 does not need air pressure adjustment, the second determination information indicating that the tire 11 needs air pressure adjustment. In addition, the first determination information is output when the first corrected air pressure exceeds the first threshold, and the second determination information is output when the first corrected air pressure is equal to or lower than the first threshold. With this configuration, compared with a configuration where the determination information includes only the air pressure after correction, it is possible to eliminate the time and effort for employees of the office to determine, based on the air pressure after correction, whether or not air pressure adjustment is necessary.

In addition, in the tire air pressure management system 100, the air pressure and the air temperature of the tire 11 are acquired at the second timing when the vehicle 1 moves out of the second specific range. Subsequently, when the second corrected air pressure that is the air pressure acquired at the second timing and corrected, is equal to or lower than the first reference value, the first notification information that includes an indication of the fact is transmitted to the electronic mail address of the user. This makes it possible to notify the user that the air pressure of the tire 11 is equal to or lower than the first reference value. It is thus possible to urge the user to perform air pressure adjustment of the tire 11.

In addition, in the tire air pressure management system 100, when the first corrected air pressure that is acquired at the first timing that arrives after the first notification information is output, exceeds the first reference value, the first privilege is granted to the user. This makes it possible to strongly urge the user to perform air pressure adjustment of the tire 11.

In addition, in the tire air pressure management system 100, the air pressure and the air temperature of the tire 11 are acquired at the second timing when the vehicle 1 moves out of the second specific range. In addition, the abnormality of the tire 11 is detected based on: the second corrected air pressure acquired at the second timing and corrected; and the first corrected air pressure acquired at the first timing closest to the second timing. Subsequently, when the abnormality has been detected, the second notification information that includes an indication of the fact is output to the electronic mail address of the user and to the terminal apparatus 3. This makes it possible to urge the user to take actions such as stopping using the vehicle 1, performing tire replacement, or the like, and urge the employees at the office to take actions such as stopping the rental of the vehicle 1.

In addition, in the tire air pressure management system 100, the abnormality is detected when the decrease speed of the air pressure of the tire 11 that is acquired based on the first corrected air pressure and the second corrected air pressure, exceeds the second threshold. This makes it possible to detect the abnormality of the tire 11 accurately.

In addition, in the tire air pressure management system 100, the second notification information includes: the degree information that indicates a degree of the abnormality that is based on a difference between the decrease speed and the second threshold; and a message that tire replacement is necessary. This makes it possible to notify the user that tire replacement is necessary, and the degree of the necessity. It is thus possible to strongly urge the user or the like to take actions such as tire replacement.

In addition, in the tire air pressure management system 100, the size information of the tire 11 and the type information of the tire 11 are output together with the second notification information. This eliminates the time and effort for the user or the like to confirm the size and type of the tire 11 that has been used so far, in preparation of a new tire 11 for replacement.

In addition, in the tire air pressure management system 100, it is determined whether or not the vehicle 1 has stopped in the first specific range, based on whether or not a communication by the first communication apparatus 2 with the air pressure detection device 12 has been established. With this configuration, it is possible to determine whether or not the vehicle 1 has stopped in the first specific range, without having means for acquiring position information of the vehicle 1, or means for detecting that the vehicle 1 has stopped in the first specific range. It is thus possible to simplify the configuration of the tire air pressure management system 100.

Second Embodiment

Figure 5:
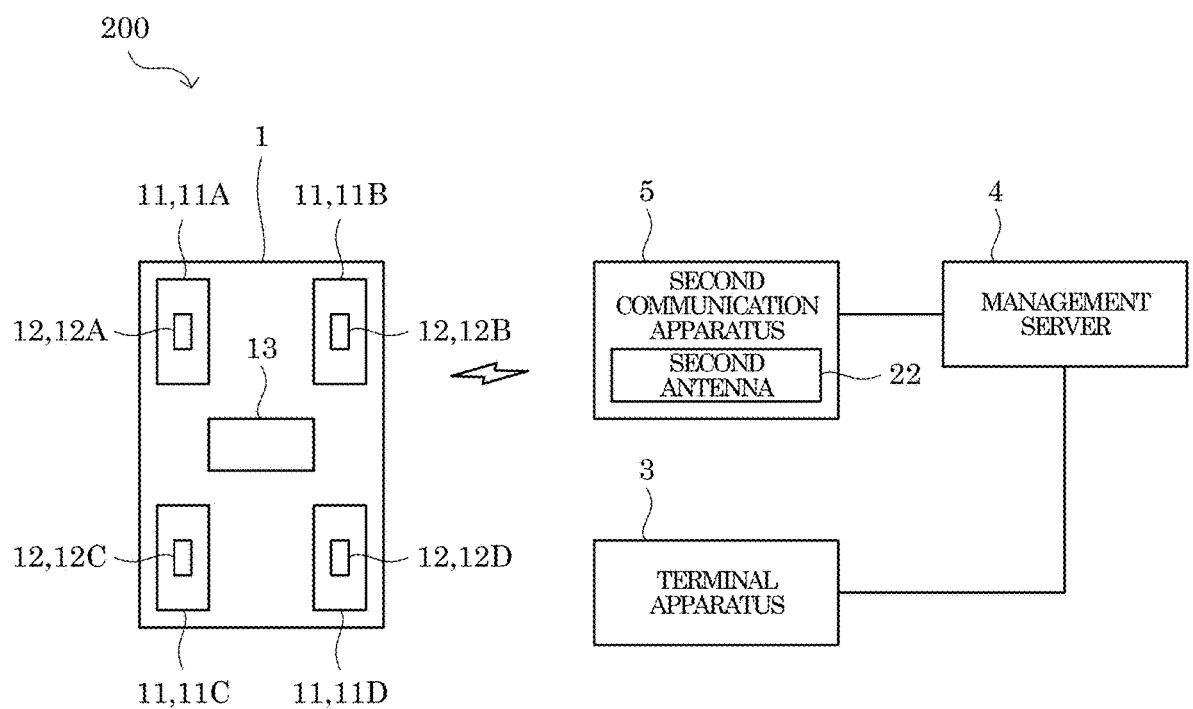
FIG. 5 is a diagram showing a configuration of a tire air pressure management system according to a second embodiment of the present disclosure.
Figure 6:
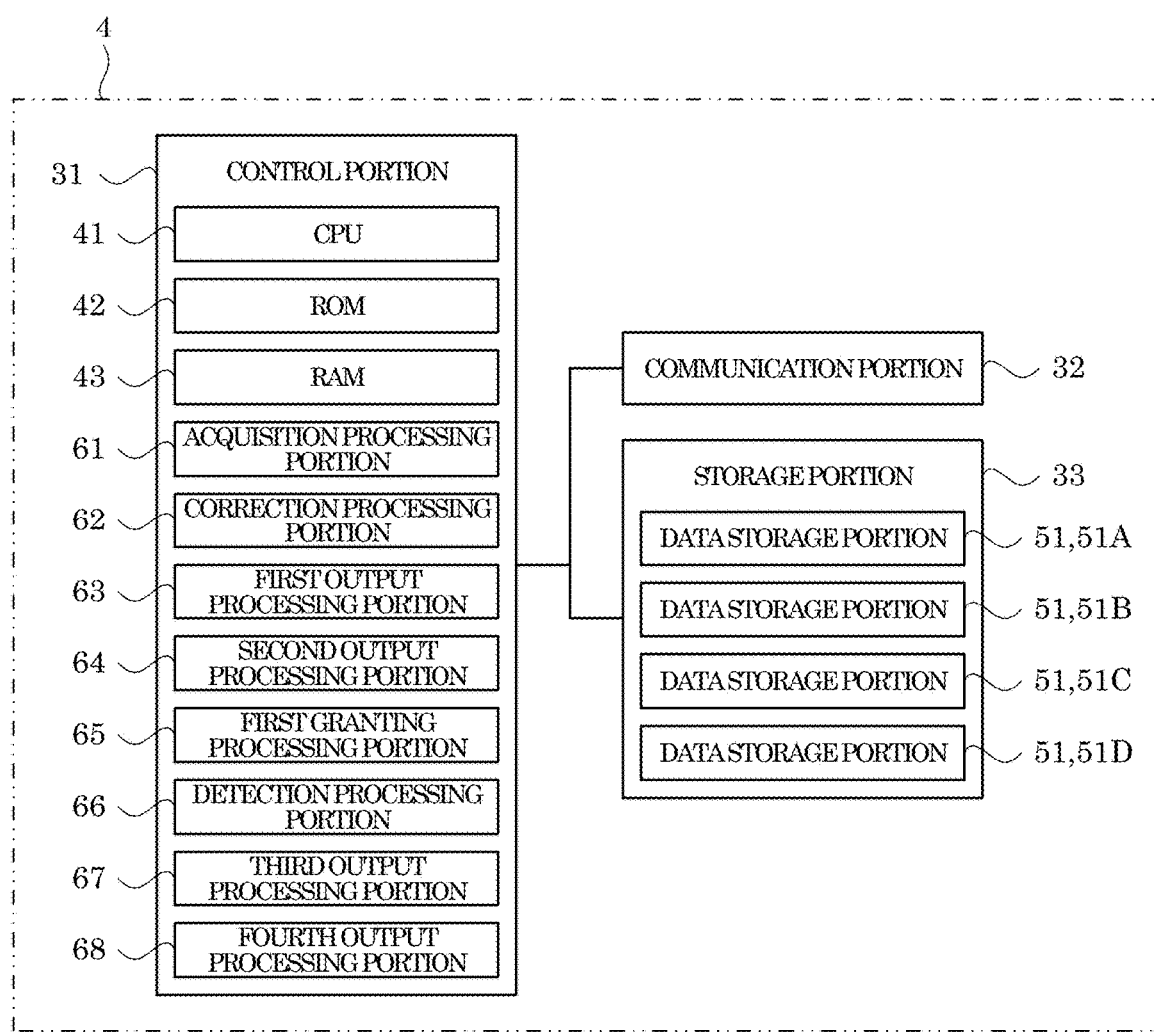
FIG. 6 is a diagram showing a configuration of a management server of the tire air pressure management system according to the second embodiment of the present disclosure.

Next, with reference to FIG. 5 and FIG. 6, a description is given of a configuration of a tire air pressure management system 200 according to a second embodiment of the present disclosure.

As shown in FIG. 5, the tire air pressure management system 200 includes the vehicle 1, the terminal apparatus 3, the management server 4, and a second communication apparatus 5. In the tire air pressure management system 200, the management server 4 is connected so as to mutually communicate with the second communication apparatus 5 and the terminal apparatus 3 via the communication network. It is noted that the terminal apparatus 3 has the same configuration as the terminal apparatus 3 of the tire air pressure management system 100.

The vehicle 1 has the same configuration as the vehicle 1 of the tire air pressure management system 100 except that it includes a vehicle-mounted communication apparatus 13 shown in FIG. 5. In the following, only configurations different from those of the vehicle 1 of the tire air pressure management system 100 are described.

The vehicle-mounted communication apparatus 13 receives the detection data transmitted from the air pressure detection devices 12. Specifically, the vehicle-mounted communication apparatus 13 executes wireless communications according to the first wireless communication standard with the air pressure detection devices 12 and receives the detection data transmitted from the air pressure detection devices 12.

In the tire air pressure management system 200, the air pressure detection devices 12 and the vehicle-mounted communication apparatus 13 are both provided in the vehicle 1. Thus the air pressure detection devices 12 can always communicate with the vehicle-mounted communication apparatus 13. The air pressure detection devices 12 execute the detection process and the transmission process at the execution cycle.

In addition, the vehicle-mounted communication apparatus 13 acquires position information that indicates the current position of the vehicle 1. For example, the vehicle-mounted communication apparatus 13 is provided with a GPS receiver that receives radio waves transmitted from a GPS satellite. The vehicle-mounted communication apparatus 13 acquires the position information based on information that is included in the radio waves received by the GPS receiver.

In addition, the vehicle-mounted communication apparatus 13 transmits the received detection data to the second communication apparatus 5. For example, the vehicle-mounted communication apparatus 13 executes a wireless communication according to a predetermined second wireless communication standard, with the second communication apparatus 5 (see FIG. 5) that is located in a communication range of the second wireless communication standard from the vehicle-mounted communication apparatus 13. For example, the second wireless communication standard is LTE. In this case, the vehicle-mounted communication apparatus 13 can execute wireless communication with the second communication apparatus 5 that is located in a range of several kilometers. It is noted that the second wireless communication standard may be different from LTE.

The vehicle-mounted communication apparatus 13, upon receiving the detection data from the air pressure detection device 12, adds second additional data to the received detection data. Subsequently, the vehicle-mounted communication apparatus 13 transmits the detection data added with the second additional data to the second communication apparatus 5. The second additional data includes the position information and reception date/time information indicating the date and the time at which the detection data was received.

In addition, the vehicle-mounted communication apparatus 13 includes a display portion that is used to display information output from the management server 4.

The second communication apparatus 5 receives the detection data transmitted from the vehicle-mounted communication apparatus 13, and transmits the received detection data to the management server 4. The second communication apparatus 5 may be disposed in the office, or at an arbitrary position outside the office.

As shown in FIG. 5, the second communication apparatus 5 includes a second antenna 22. The second antenna 22 is used for a wireless communication with the vehicle-mounted communication apparatus 13. The second communication apparatus 5 executes the wireless communication according to the second wireless communication standard, with the vehicle-mounted communication apparatus 13 that is located in a communication range of the second wireless communication standard from the second antenna 22.

The second communication apparatus 5, upon receiving the detection data from the vehicle-mounted communication apparatus 13, transmits the received detection data to the management server 4.

The management server 4 has the same configuration as the management server 4 of the tire air pressure management system 100 except that the acquisition processing portion 61 performs a different process, and that it includes a fourth output processing portion 68 shown in FIG. 6. The following describes only configurations different from those of the management server 4 of the tire air pressure management system 100.

The acquisition processing portion 61 determines, based on the position information included in the detection data transmitted from the second communication apparatus 5, whether or not the vehicle 1 has stopped in the first specific range, and whether or not the vehicle 1 has moved out of the second specific range.

For example, in the tire air pressure management system 200, the first specific range and the second specific range are each the premise of the office.

In addition, the acquisition processing portion 61 acquires the air pressure and the air temperature of the tire 11 at a third timing when the vehicle 1 stops outside the first specific range. Specifically, the acquisition processing portion 61 determines whether or not the vehicle 1 has stopped outside the first specific range, based on the position information included in the detection data transmitted from the second communication apparatus 5. It is noted that the acquisition processing portion 61 may acquire the air pressure and the air temperature of the tire 11 at an arbitrary timing in a time period from the second timing to the first timing. For example, the acquisition processing portion 61 may acquire the air pressure and the air temperature of the tire 11 while the vehicle 1 is running. In this case, the correction processing portion 62 may correct the air pressure based on the air pressure and the air temperature of the tire 11 acquired while the vehicle 1 is running.

The fourth output processing portion 68 outputs air pressure data that includes the first corrected air pressure, the second corrected air pressure, and a third corrected air pressure that is the air pressure acquired at the third timing and corrected by the correction processing portion 62.

For example, the air pressure data includes a graph that indicates the transition of the air pressure of each of the tires 11 during the time period from the second timing to the first timing, wherein the graph is generated based on the second corrected air pressure, the third corrected air pressure, and the first corrected air pressure that are acquired during the time period from the second timing to the first timing. It is noted that the air pressure data may include a corrected air pressure that is an air pressure acquired while the vehicle 1 is running and corrected by the correction processing portion 62.

For example, upon arrival of the first timing, the fourth output processing portion 68 generates the air pressure data. Subsequently, the fourth output processing portion 68 outputs the generated air pressure data to a display portion of the vehicle-mounted communication apparatus 13. In addition, the fourth output processing portion 68 may transmit an electronic mail including the air pressure data to the electronic mail address of the user. This makes it possible for the user or the driver of the vehicle 1 to determine, based on the air pressure data, the quality of his/her driving.

It is noted that the fourth output processing portion 68 may determine, based on the air pressure data, the quality of the driving of the driver of the vehicle 1, and add the determination result to the air pressure data.

For example, the fourth output processing portion 68 divides the time period from the second timing to the first timing at equal intervals, and calculates, for each of the divided periods, a speed at which the air pressure decreases. Subsequently, the fourth output processing portion 68 determines the quality of the driving of the driver of the vehicle 1, based on a ratio of the number of calculated speeds that exceed a predetermined reference speed to the total number of calculated speeds. For example, the fourth output processing portion 68 evaluates the quality of the driving of the driver of the vehicle 1 by ten levels from "10" (best) to "1" (worst). In this case, the fourth output processing portion 68 assigns a higher evaluation value on the quality of the driving of the driver of the vehicle 1 as the ratio becomes lower.

In addition, when the user has logged in the management server 4 by using a terminal apparatus such as a smartphone, the fourth output processing portion 68 may display the air pressure data on a display portion of the terminal apparatus. In this case, the storage portion 33 may preliminarily store authentication information that is used for the user to log in the management server 4. In addition, when the authentication information has been input to the management server 4 via the terminal apparatus of the user, the management server 4 permits the user to log in the management server 4. It is noted that the authentication information is a user name, a password, or the like.

It is noted that the first output processing portion 63 of the management server 4 may output the determination information to the display portion of the vehicle-mounted communication apparatus 13. In addition, the second output processing portion 64 of the management server 4 may output the first notification information to the display portion of the vehicle-mounted communication apparatus 13. In addition, the third output processing portion 67 of the management server 4 may output the second notification information to the display portion of the vehicle-mounted communication apparatus 13. In addition, the first output processing portion 63 of the management server 4 may output, at the third timing, the determination information based on the third corrected air pressure.

[Second Air Pressure Management Process]

In the following, with reference to FIG. 7, a description is given of an example of the procedure of a second air pressure management process executed by the control portion 31 of the management server 4 in the tire air pressure management system 200.

Figure 3:
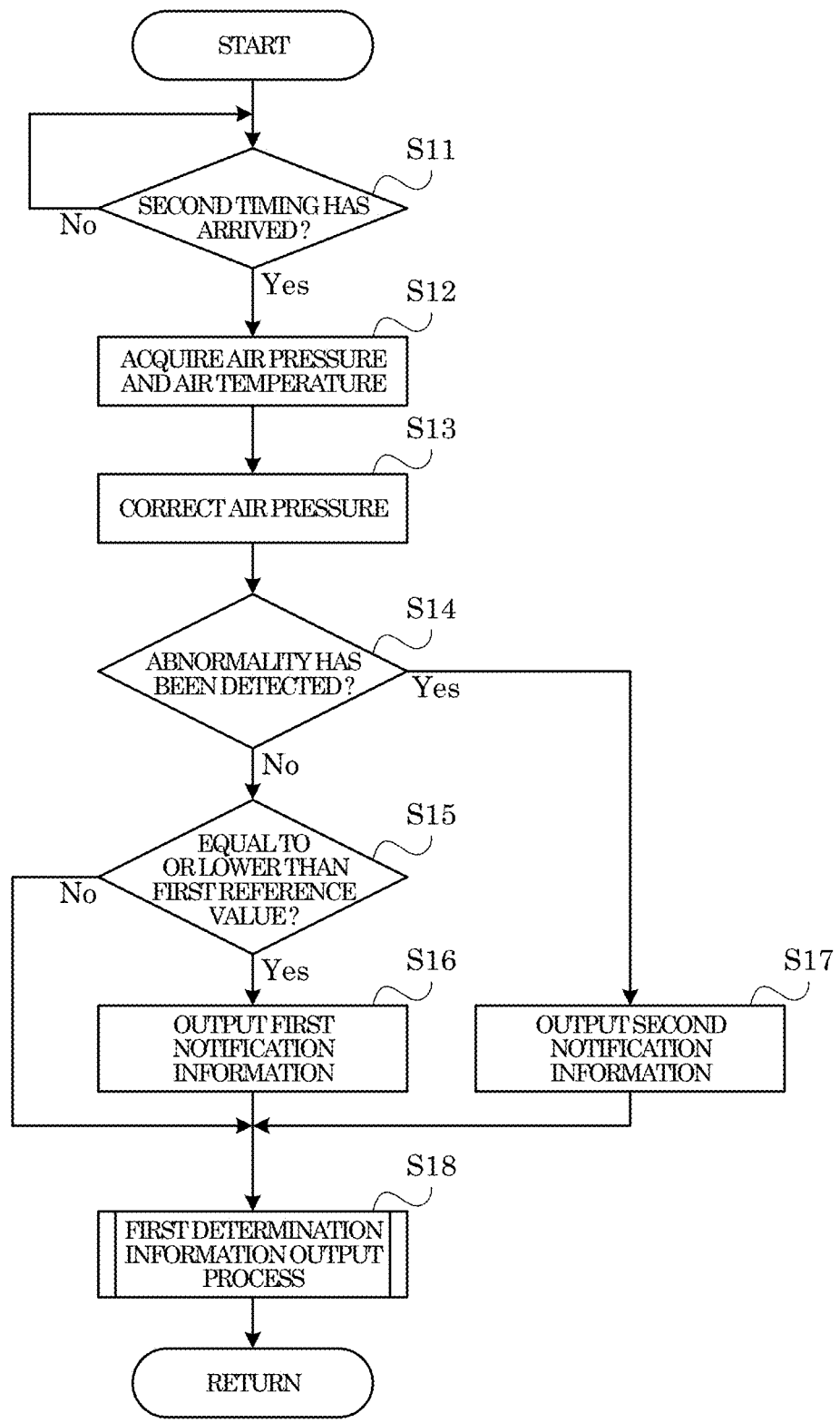
FIG. 3 is a flowchart showing an example of a first air pressure management process executed by the management server of the tire air pressure management system according to the first embodiment of the present disclosure.
Figure 7:
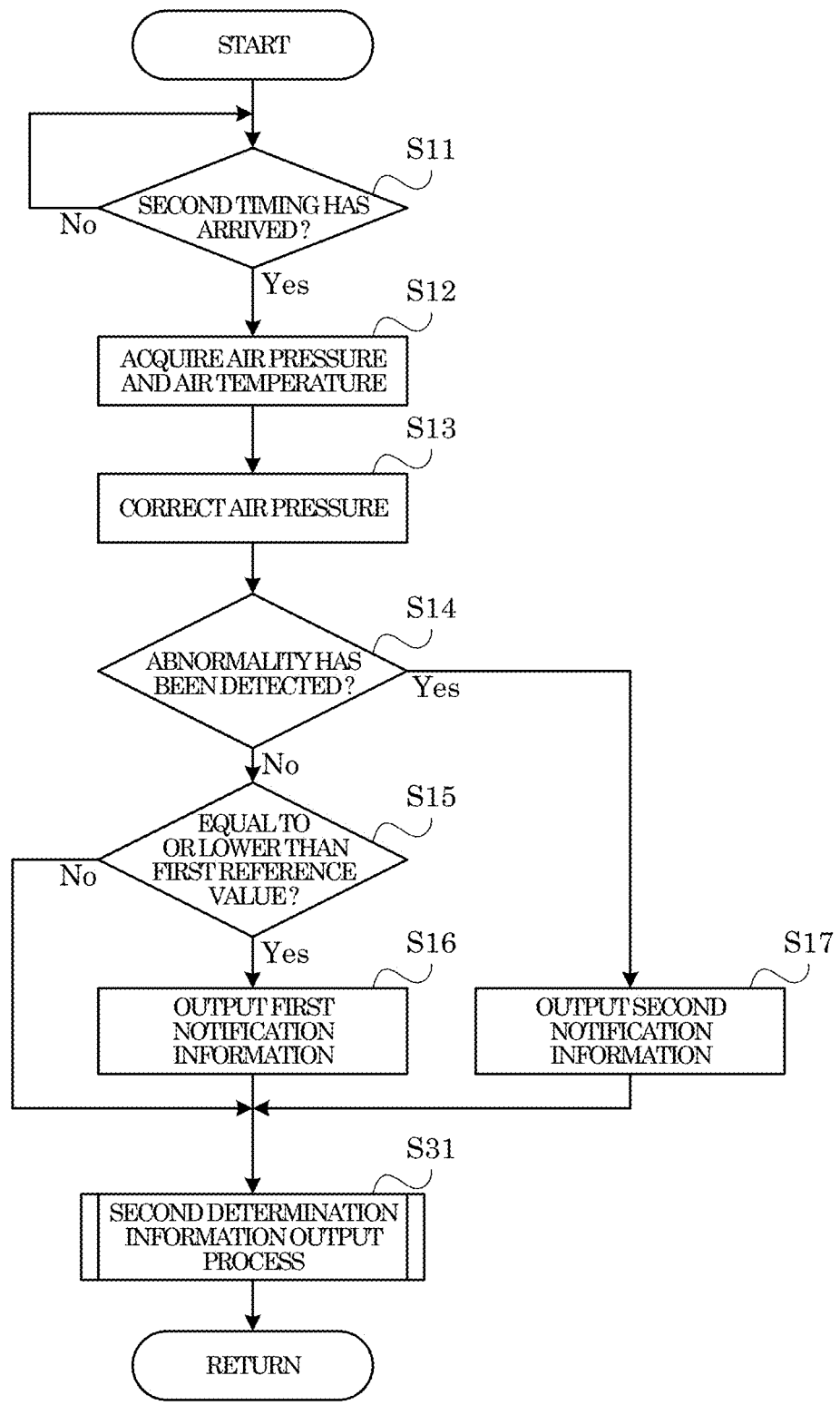
FIG. 7 is a flowchart showing an example of a second air pressure management process executed by the management server of the tire air pressure management system according to the second embodiment of the present disclosure.

The second air pressure management process is the same as the first air pressure management process shown in FIG. 3 except that the process of step S18 (see FIG. 3) is replaced by the process of step S31 (see FIG. 7). The following describes only a process different from that of the first air pressure management process.

<Step S31>

In step S31, the control portion 31 executes a second determination information output process described in the following.

[Second Determination Information Output Process]

Figure 8:
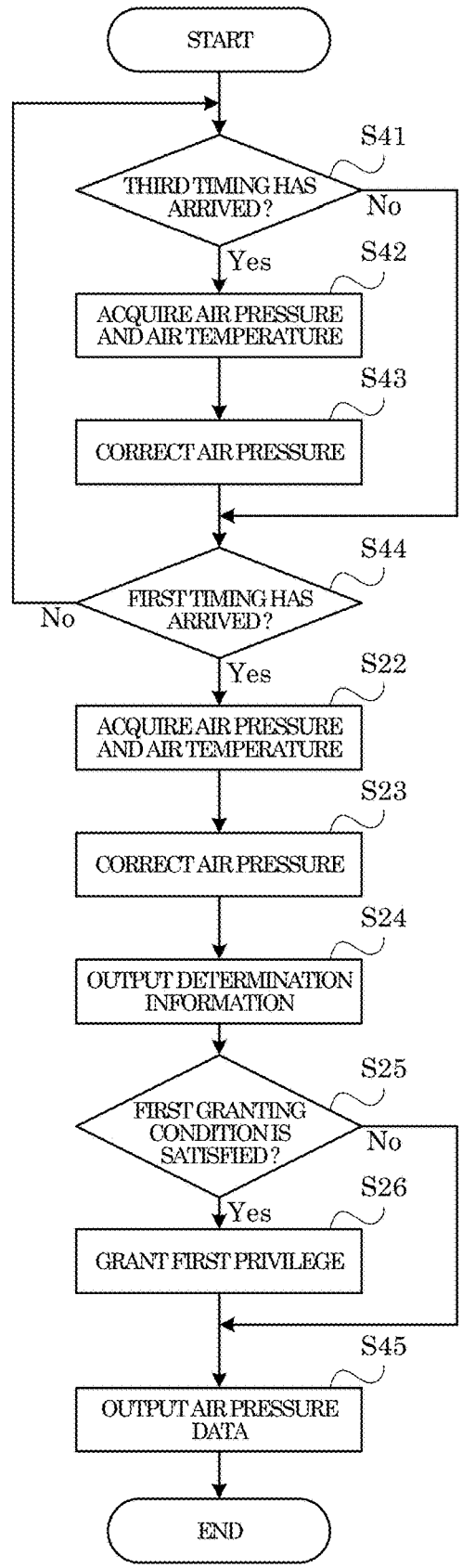
FIG. 8 is a flowchart showing an example of a second determination information output process executed by the management server of the tire air pressure management system according to the second embodiment of the present disclosure.

Next, with reference to FIG. 8, a description is given of an example of the procedure of a second determination information output process that is executed in step S31 of the second air pressure management process.

The second determination information output process is the same as the first determination information output process shown in FIG. 4 except that the process of step S21 (see FIG. 4) is replaced by the process of steps S41 to S44 (see FIG. 8), and that the process of step S45 (see FIG. 8) is executed after the process of step S26 (see FIG. 4). The following describes only processes different from those of the first determination information output process.

<Step S41>

First, in step S41, the control portion 31 determines whether or not the third timing has arrived. Here, the process of step S41 is executed by the acquisition processing portion 61 of the control portion 31.

Here, upon determining that the third timing has arrived (Yes side at step S41), the control portion 31 moves the process to step S42. In addition, upon determining that the third timing has not arrived (No side at step S41), the control portion 31 moves the process to step S44.

<Step S42>

In step S42, the control portion 31 acquires the air pressure and the air temperature for each of the tires 11. Here, the process of step S42 is executed by the acquisition processing portion 61 of the control portion 31.

<Step S43>

In step S43, the control portion 31 corrects the air pressure of each of the tires 11 acquired in step S42. Here, the process of step S43 is executed by the correction processing portion 62 of the control portion 31.

<Step S44>

In step S44, the control portion 31 determines whether or not the first timing has arrived. Here, the process of step S44 is executed by the acquisition processing portion 61 of the control portion 31.

Here, upon determining that the first timing has arrived (Yes side at step S44), the control portion 31 moves the process to step S22. In addition, upon determining that the first timing has not arrived (No side at step S44), the control portion 31 moves the process to step S41.

<Step S45>

In step S45, the control portion 31 outputs the air pressure data to the display portion of the vehicle-mounted communication apparatus 13. Here, the process of step S45 is executed by the fourth output processing portion 68 of the control portion 31.

As described above, in the tire air pressure management system 200, the air pressure and the air temperature of the tire 11 are acquired at the third timing when the vehicle 1 stops outside the first specific range. Subsequently, the air pressure data that includes the first corrected air pressure, the second corrected air pressure, and the third corrected air pressure that is the air pressure acquired at the third timing and corrected, is output to the display portion of the vehicle-mounted communication apparatus 13. This responds to the need for the driver of the vehicle 1 to know the transition of the air pressure of the tires 11 while using the vehicle 1.

It is noted that in the tire air pressure management system 200, the vehicle-mounted communication apparatus 13 may include the configurations of the management server 4. In this case, the tire air pressure management system 200 may not include the terminal apparatus 3, the management server 4, and the second communication apparatus 5.

Third Embodiment

Figure 9:
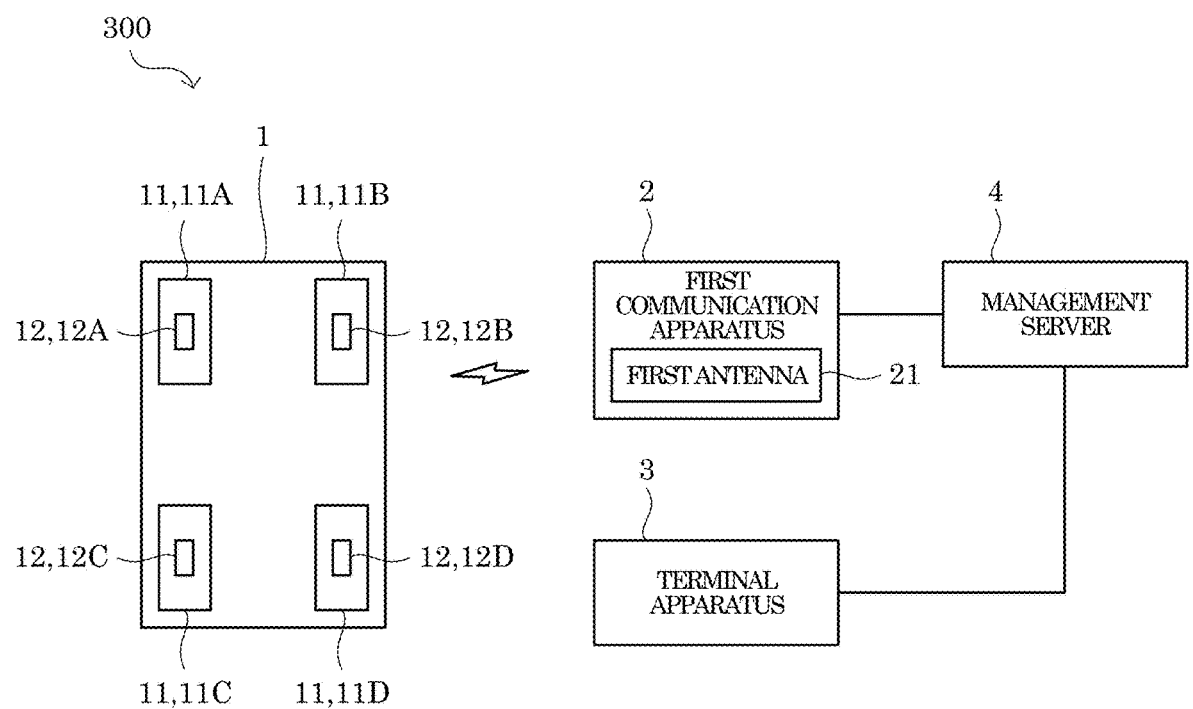
FIG. 9 is a diagram showing a configuration of a tire air pressure management system according to a third embodiment of the present disclosure.
Figure 10:
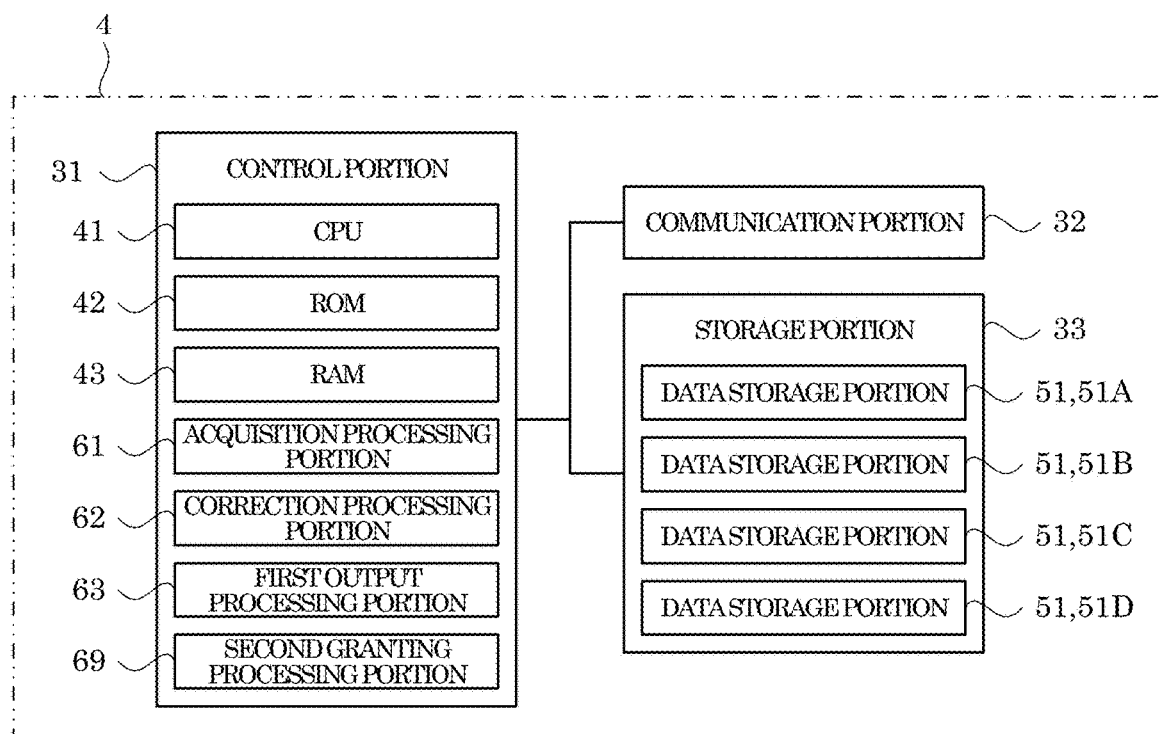
FIG. 10 is a diagram showing a configuration of a management server of the tire air pressure management system according to the third embodiment of the present disclosure.

Next, with reference to FIG. 9 and FIG. 10, a description is given of a configuration of a tire air pressure management system 300 according to a third embodiment of the present disclosure.

As shown in FIG. 9, the tire air pressure management system 300 includes the vehicle 1, the first communication apparatus 2, the terminal apparatus 3, and the management server 4. In the tire air pressure management system 300, the management server 4 is connected so as to mutually communicate with the first communication apparatus 2 and the terminal apparatus 3 via the communication network. It is noted that the vehicle 1 has the same configuration as the vehicle 1 of the tire air pressure management system 100.

In the tire air pressure management system 300, the first communication apparatus 2 is installed not at the office, but at a gas station, such as a gasoline stand or a service station, run by the rental car business agent. It is noted that the first communication apparatus 2 has the same configuration as the first communication apparatus 2 of the tire air pressure management system 100 except that it is installed at a different location.

In the tire air pressure management system 300, the terminal apparatus 3 is, as is the case with the first communication apparatus 2, installed at the gas station. It is noted that the terminal apparatus 3 has the same configuration as the terminal apparatus 3 of the tire air pressure management system 100 except that it is installed at a different location.

In addition, in the tire air pressure management system 300, the first specific range is a range corresponding to the gas station. Specifically, the first specific range is a communication range of a wireless communication performed by the first communication apparatus 2 installed at the gas station, according to the first wireless communication standard.

The management server 4 has the same configuration as the management server 4 of the tire air pressure management system 100 except that it does not include the second output processing portion 64, the first granting processing portion 65, the detection processing portion 66, and the third output processing portion 67, and that it includes a second granting processing portion 69 shown in FIG. 10. The following describes only configurations different from those of the management server 4 of the tire air pressure management system 100.

When the first corrected air pressure is in a predetermined reference range, the second granting processing portion 69 grants a predetermined second privilege to the user. Here, the reference range is a numerical range that is used to determine whether or not the air pressure of the tire 11 is normal.

For example, the second privilege is a second coupon that is used to reduce a rental fee of the vehicle 1 or a fee for gasoline provided by the gas station. It is noted that the second privilege may be a ticket that allows for a puncture of the tire 11 to be repaired for free at the gas station.

For example, when the first corrected air pressure is in the reference range and a predetermined second granting condition is satisfied, the second granting processing portion 69 grants the second privilege to the user.

For example, the second granting condition is that the remaining time before the end of a renting period of the vehicle 1 has become shorter than a predetermined time. In this case, the renting period may be preliminarily registered in the management server 4.

It is noted that when the renting period is long, the second granting condition may be that the number of visits to the gas station within one month has reached a predetermined number of times. In addition, the second granting condition may include that a staying time of the vehicle 1 at the gas station has exceeded a predetermined time. The staying time is used to determine whether or not the service provided for the vehicle 1 is only a gasoline refueling service.

In addition, when the second privilege is a free ticket for puncture repair, the second granting condition may include that it is determined, based on the air pressure acquired thereafter, that the tire 11 has been punctured. In this case, the vehicle 1 may include the vehicle-mounted communication apparatus 13 (see FIG. 5), and transmit the detection data to the management server 4 as needed. In addition, granting of the second privilege may not be permitted when it is determined, based on a traveling locus of the vehicle 1 until the tire 11 was punctured, that the vehicle 1 had run on the shoulder or had come in contact with the curb. The traveling locus of the vehicle 1 can be acquired based on the position information added to the detection data transmitted from the vehicle-mounted communication apparatus 13. In addition, the determination on whether or not the vehicle 1 had run on the shoulder or had come in contact with the curb can be made based on the traveling locus of the vehicle 1 and map data preliminarily stored in the storage portion 33.

In addition, the second granting processing portion 69 may grant the second privilege to the user when the first corrected air pressure is out of the reference range, and the air pressure acquired by the acquisition processing portion 61 and corrected by the correction processing portion 62 before the vehicle 1 moves out of the first specific range is in the reference range.

For example, the second granting processing portion 69 may grant the second privilege to the user when the air pressure acquired by the acquisition processing portion 61 and corrected by the correction processing portion 62 before the vehicle 1 moves out of the first specific range is in the reference range, and a predetermined third granting condition is satisfied.

For example, the third granting condition is the same condition as the second granting condition. It is noted that the third granting condition may be different from the second granting condition.

[Third Air Pressure Management Process]

Figure 11:
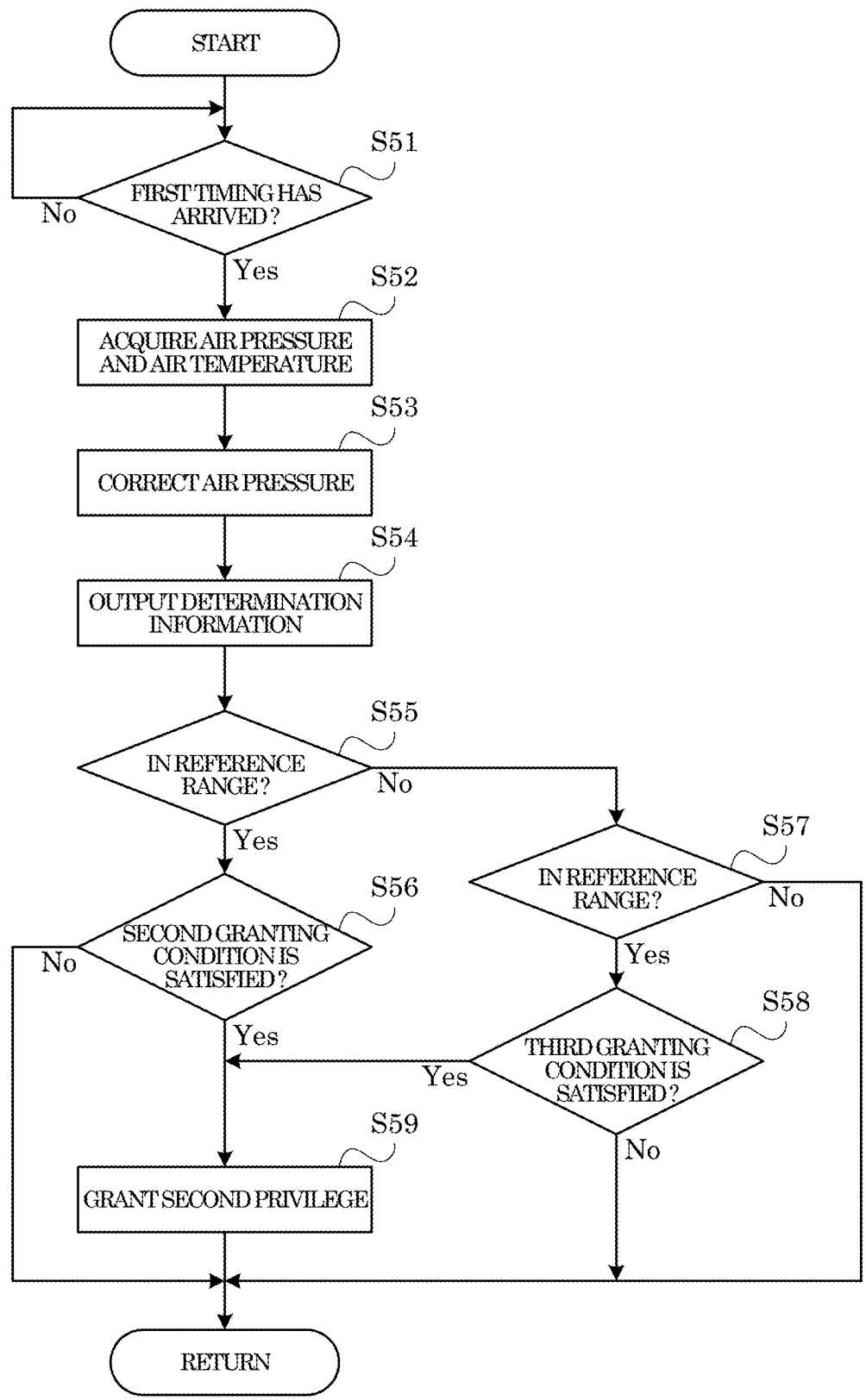
FIG. 11 is a flowchart showing an example of a third air pressure management process executed by the management server of the tire air pressure management system according to the third embodiment of the present disclosure.

In the following, with reference to FIG. 11, a description is given of an example of the procedure of a third air pressure management process executed by the control portion 31 of the management server 4 in the tire air pressure management system 300.

<Step S51>

First, in step S51, the control portion 31 determines whether or not the first timing has arrived. In other words, the control portion 31 determines whether or not the the vehicle 1 has stopped in the communication range of the wireless communication performed by the first communication apparatus 2 installed at the gas station. Here, the process of step S51 is executed by the acquisition processing portion 61 of the control portion 31.

Here, upon determining that the first timing has arrived (Yes side at step S51), the control portion 31 moves the process to step S52. In addition, upon determining that the first timing has not arrived (No side at step S51), the control portion 31 waits, at step S51, for the first timing to arrive.

<Step S52>

In step S52, the control portion 31 acquires the air pressure and the air temperature for each of the tires 11. Here, the process of step S52 is executed by the acquisition processing portion 61 of the control portion 31.

<Step S53>

In step S53, the control portion 31 corrects the air pressure of each of the tires 11 acquired in step S52. Here, the process of step S53 is executed by the correction processing portion 62 of the control portion 31.

<Step S54>

In step S54, the control portion 31 outputs the determination information for each of the tires 11. Specifically, the control portion 31 outputs the determination information to the display portion of the terminal apparatus 3 installed at the gas station. Here, the process of step S54 is executed by the first output processing portion 63 of the control portion 31.

<Step S55>

In step S55, the control portion 31 determines, for all of the four tires 11, whether or not the first corrected air pressure acquired in step S53 is in the specific range.

Here, upon determining, for all of the four tires 11, that the first corrected air pressure acquired in step S53 is in the specific range (Yes side at step S55), the control portion 31 moves the process to step S56. In addition, upon determining, for one or more of the four tires 11, that the first corrected air pressure acquired in step S53 is out of the specific range (No side at step S55), the control portion 31 moves the process to step S57.

<Step S56>

In step S56, the control portion 31 determines whether or not the second granting condition is satisfied.

Here, upon determining that the second granting condition is satisfied (Yes side at step S56), the control portion 31 moves the process to step S59. In addition, upon determining that the second granting condition is not satisfied (No side at step S56), the control portion 31 moves the process to step S51.

<Step S57>

In step S57, the control portion 31 determines, for the tire 11 for which the first corrected air pressure was determined to be out of the specific range, whether or not the air pressure acquired and corrected before the vehicle 1 moves out of the first specific range is in the reference range.

Here, upon determining, for the tire 11 for which the first corrected air pressure was determined to be out of the specific range, that the air pressure acquired and corrected before the vehicle 1 moves out of the first specific range is in the reference range (Yes side at step S57), the control portion 31 moves the process to step S58. In addition, upon determining that the vehicle 1 has moved out of the first specific range before the corrected air pressure is determined to be in the specific range (No side at step S57), the control portion 31 moves the process to step S51.

<Step S58>

In step S58, the control portion 31 determines whether or not the third granting condition is satisfied.

Here, upon determining that the third granting condition is satisfied (Yes side at step S58), the control portion 31 moves the process to step S59. In addition, upon determining that the third granting condition is not satisfied (No side at step S58), the control portion 31 moves the process to step S51.

<Step S59>

In step S59, the control portion 31 grants the second privilege to the user. Here, the process of step S59 is executed by the second granting processing portion 69 of the control portion 31.

As described above, in the tire air pressure management system 300, the second privilege is granted to the user when the first corrected air pressure is in the reference range, or when the first corrected air pressure is out of the reference range, and the air pressure acquired and corrected before the vehicle 1 moves out of the gas station is in the reference range. This makes it possible to urge the user to visit the gas station and adjust the air pressure.

It is noted that the vehicle 1 is not limited to a rental vehicle, but may be, for example, a passenger car or a business vehicle. In this case, the first specific range may correspond to an address of the owner of the vehicle 1 or a place of business. In addition, the vehicle 1 is not limited to an automobile, but may be any entity to which the tire 11 is attached. For example, the vehicle 1 may include a motorcycle, a three-wheel riding vehicle, a truck, and a bus.

The embodiments of the present disclosure described above include the following disclosure items (1) to (14).

Disclosure item (1) is a tire air pressure management system including: an acquisition processing portion configured to acquire an air pressure inside a pneumatic tire attached to a vehicle, and an air temperature inside the pneumatic tire; a correction processing portion configured to correct the air pressure that has been acquired by the acquisition processing portion together with the air temperature, based on a difference between the air temperature and a predetermined reference temperature; and a first output processing portion configured to output determination information that is generated based on the air pressure after correction by the correction processing portion and is used to determine whether or not the pneumatic tire needs air pressure adjustment.

With the above-described configuration, it is possible to eliminate the need of an inspection work on the air pressure of the tire by a worker who performs an inspection work on the vehicle, by transmitting the output determination information to the worker. It is thus possible to reduce a work load of the worker performing the inspection work on the vehicle.

Disclosure item (2) is the tire air pressure management system according to the disclosure item (1), wherein the acquisition processing portion acquires the air pressure and the air temperature at a first timing when the vehicle stops in a predetermined first specific range, and the first output processing portion outputs the determination information that is generated based on a first corrected air pressure that is the air pressure acquired at the first timing and corrected by the correction processing portion.

With the above-described configuration, it is possible to output the determination information that is based on the air pressure at a timing immediately before the inspection work on the vehicle is performed, by determining the first specific range as a range corresponding to an inspection place of the vehicle. It is thus possible to increase the accuracy of the determination on whether or not air pressure adjustment of the tire is necessary.

Disclosure item (3) is the tire air pressure management system according to disclosure item (2), wherein the determination information includes first determination information and second determination information, wherein the first determination information indicates that the pneumatic tire does not need air pressure adjustment, and the second determination information indicates that the pneumatic tire needs air pressure adjustment, and when the first corrected air pressure exceeds a predetermined first threshold, the first output processing portion outputs the first determination information, and when the first corrected air pressure is equal to or lower than the first threshold, the first output processing portion outputs the second determination information.

With the above-described configuration, compared with a configuration where the determination information includes only the air pressure after correction, it is possible to eliminate the time and effort for the worker to determine, based on the air pressure after correction, whether or not air pressure adjustment is necessary.

Disclosure item (4) is the tire air pressure management system according to disclosure item (2) or (3), wherein the vehicle is a rental vehicle that is rented out to a predetermined user, and the first specific range is a range corresponding to a predetermined return place of the rental vehicle.

Disclosure item (5) is the tire air pressure management system according to disclosure item (4), wherein the acquisition processing portion acquires the air pressure and the air temperature at a second timing when the rental vehicle moves out of a second specific range that corresponds to a predetermined rent-out place of the rental vehicle, and the tire air pressure management system further includes a second output processing portion configured to, when a second corrected air pressure that is the air pressure acquired at the second timing and corrected by the correction processing portion, is equal to or lower than a predetermined first reference value, output first notification information that includes an indication of that fact.

With the above-described configuration, it is possible to notify the rental vehicle's user that the air pressure of the tire is equal to or lower than the first reference value, by transmitting the output first notification information to the user. It is thus possible to urge the user to perform air pressure adjustment of the tire.

Disclosure item (6) is the tire air pressure management system according to disclosure item (5), further including a first granting processing portion configured to grant a predetermined first privilege to the user when the first corrected air pressure that is acquired at the first timing that arrives after the first notification information is output, exceeds the first reference value.

With the above-described configuration, it is possible to grant a privilege to the user when the first notification information has been output, and air pressure adjustment of the tire has been performed by the user. It is thus possible to strongly urge the user to perform air pressure adjustment of the tire.

Disclosure item (7) is the tire air pressure management system according to any one of disclosure items (4) to (6), wherein the acquisition processing portion acquires the air pressure and the air temperature at a second timing when the rental vehicle moves out of a second specific range that corresponds to a predetermined rent-out place of the rental vehicle, and the tire air pressure management system further includes: a detection processing portion configured to detect abnormality of the pneumatic tire based on a second corrected air pressure that is the air pressure acquired at the second timing and corrected by the correction processing portion, and the first corrected air pressure acquired at the first timing closest to the second timing; and a third output processing portion configured to, when the detection processing portion has detected the abnormality, output second notification information that includes an indication of that fact.

With the above-described configuration, it is possible to notify the rental vehicle's user that the abnormality has been detected, by transmitting the output second notification information to the user. This makes it possible to urge the user to take actions such as stopping using the rental vehicle, performing tire replacement, or the like. In addition, it is possible to urge the business agent who conducts the vehicle rental business to take actions such as stopping the rental of the rental vehicle, by transmitting the second notification information to the business agent.

Disclosure item (8) is the tire air pressure management system according to disclosure item (7), wherein the detection processing portion detects the abnormality when a decrease speed of the air pressure that is acquired based on the first corrected air pressure and the second corrected air pressure, exceeds a predetermined second threshold.

With the above-described configuration, it is possible to detect the abnormality of the tire accurately.

Disclosure item (9) is the tire air pressure management system according to disclosure item (8), wherein the second notification information includes: degree information that indicates a degree of the abnormality that is based on a difference between the decrease speed and the second threshold; and a message that tire replacement is necessary.

With the above-described configuration, it is possible to notify the user of the rental vehicle or the like that tire replacement is necessary, and the degree of the necessity. It is thus possible to strongly urge the user or the like to take actions such as tire replacement.

Disclosure item (10) is the tire air pressure management system according to disclosure item (9), wherein the third output processing portion outputs, together with the second notification information, either or both of size information of the pneumatic tire and type information of the pneumatic tire.

With the above-described configuration, it is possible to eliminate the time and effort to confirm the size and the type of the tire that has been used so far when the user of the rental vehicle or the like prepares a new tire for replacement.

Disclosure item (11) is the tire air pressure management system according to any one of disclosure items (2) to (10), further including: a detection portion installed at the pneumatic tire and configured to detect the air pressure and the air temperature of the pneumatic tire; and a communication portion provided outside the vehicle and configured to communicate with the detection portion that is present in the first specific range, wherein the acquisition processing portion determines whether or not the vehicle has stopped in the first specific range, based on whether or not a communication by the communication portion with the detection portion has been established.

With the above-described configuration, it is possible to determine whether or not the vehicle has stopped in the first specific range, without providing means for acquiring position information of the vehicle, or means for detecting that the vehicle has stopped in the first specific range. It is thus possible to simplify the configuration of the tire air pressure management system.

Disclosure item (12) is the tire air pressure management system according to any one of disclosure items (5) to (10), wherein the acquisition processing portion acquires the air pressure and the air temperature at a third timing when the rental vehicle stops outside the first specific range, and the tire air pressure management system further includes a fourth output processing portion configured to output air pressure data that includes the first corrected air pressure, the second corrected air pressure, and a third corrected air pressure that is the air pressure acquired at the third timing and corrected by the correction processing portion.

With the above-described configuration, it is possible to let the driver of the rental vehicle know the transition of the air pressure of the tires while using the rental vehicle, by transmitting to the driver the information included in the air pressure data. It is thus possible to respond to the need for the driver of the rental vehicle to know the transition.

Disclosure item (13) is the tire air pressure management system according to disclosure item (2) or (3), wherein the vehicle is a rental vehicle that is rented out to a predetermined user, the first specific range corresponds to a gas station of the vehicle, and the tire air pressure management system further includes a second granting processing portion configured to grant a predetermined second privilege to the user when the first corrected air pressure is in a predetermined reference range, and when the first corrected air pressure is out of the reference range, and the air pressure acquired by the acquisition processing portion and corrected by the correction processing portion before the rental vehicle moves out of the gas station is in the reference range.

With the above-described configuration, when the rental vehicle has come to the gas station, it is possible to grant a privilege to the user of the rental vehicle when the air pressure of the tire is in the reference range, or is adjusted to be in the reference range. It is thus possible to urge the user to come to the gas station and perform air pressure adjustment.

Disclosure item (14) is a tire air pressure management method including: an acquisition step of acquiring an air pressure inside a pneumatic tire attached to a vehicle, and an air temperature inside the pneumatic tire; a correction step of correcting the air pressure that has been acquired in the acquisition step together with the air temperature, based on a difference between the air temperature and a predetermined reference temperature; and an output step of outputting determination information that is generated based on the air pressure after correction in the correction step and is used to determine whether or not the pneumatic tire needs air pressure adjustment.

The invention claimed is:

1. A tire air pressure management system comprising one or more processors configured to function as:
an acquisition processing portion configured to acquire, with a vehicle determined to have stopped in a predetermind specific area, an air pressure inside each of a plurality of pneumatic tire-tires attached to the vehicle, and an air temperature inside each of the pneumatic tire-tires, based on detection data wirelessly output from a detector in each of the pneumatic tires according to a wireless communication standard, the detection data for each of the pneumatic tires including air pressure information for the pneumatic tire air temperature information for the pneumatic tire, and detector identification information;
a correction processing portion configured to correct the air pressure that has been acquired by the acquisition processing portion together with the air temperature, based on a difference between the air temperature and a predetermined reference temperature; and
a first output processing portion configured to output determination information that is generated based on the air pressure after correction by the correction processing portion and is used to determine whether or not each of the pneumatic tires needs air pressure adjustment, wherein
the vehicle is a rental vehicle that is rented out to a predetermined user. the predetermined specific area is a premise of an office where the rental vehicle is returned,
the predetermined specific area is based on a range associated with receipt of the detection data that is wirelessly output from the detectors in the pneumatic tires according to the wireless communication standard,
the acquisition processing portion determines whether the vehicle has entered the predetermined specific area and stopped,
the acquisition processing portion acquires the air pressure and the air temperature at a first timing under a condition where the acquisition processing portion has determined that the vehicle has stopped in the predetermined specific area,
with the vehicle having been determined to be in the specific area, the correction processing portion corrects the air pressure under the condition where the acquisition processing portion has determined that the vehicle has stopped in the predetermined specific area,
the first output processing portion outputs the determination information that is generated based on a first corrected air pressure that is the air pressure acquired at the first timing and corrected by the correction processing portion, and
the output determination information output by the first output processing portion identifies at least each of the pneumatic tires having been identified as needing the air pressure adjustment.

2. The tire air pressure management system according to claim 1, wherein the one or more processors further function as
a detection processing portion configured to detect an abnormality of the pneumatic tire based on the corrected air pressure.

3. The tire air pressure management system according to claim 1,
wherein the determination information includes first determination information and second determination information,
wherein the first determination information indicates that the pneumatic tire does not need air pressure adjustment, and the second determination information indicates that the pneumatic tire needs air pressure adjustment, and
under a first condition where the first corrected air pressure exceeds a predetermined first threshold, the first output processing portion outputs the first determination information, and under a second condition where the first corrected air pressure is equal to or lower than the first threshold, the first output processing portion outputs the second determination information.

4. The tire air pressure management system according to claim 1, wherein
the acquisition processing portion acquires the air pressure and the air temperature at a second timing when the rental vehicle moves out of the premise of the office, and
the one or more processors further function as
a second output processing portion configured to, under a condition where a second corrected air pressure that is the air pressure acquired at the second timing and corrected by the correction processing portion, is equal to or lower than a predetermined first reference value, output first notification information that includes an indication of that fact.

5. The tire air pressure management system according to claim 4, wherein
the one or more processors further function as
a first granting processing portion configured to grant a predetermined first privilege to the user under a condition where the first corrected air pressure that is acquired at the first timing that arrives after the first notification information is output, exceeds the first reference value,
the first privilege includes a coupon that is used to reduce a rental fee of the rental vehicle, and
the first granting processing portion transmits an electronic mail including the coupon to an electronic mail address of the user.

6. The tire air pressure management system according to claim 4, wherein
the acquisition processing portion acquires the air pressure and the air temperature at a third timing when the rental vehicle stops outside the predetermined specific area, and
the one or more processors further function as
a fourth output processing portion configured to output air pressure data that includes the first corrected air pressure, the second corrected air pressure, and a third corrected air pressure that is the air pressure acquired at the third timing and corrected by the correction processing portion.

7. The tire air pressure management system according to claim 1, wherein
the acquisition processing portion acquires the air pressure and the air temperature at a second timing under a condition where the rental vehicle moves out of the premise of the office, and
the one or more processors further function as
a detection processing portion configured to detect an abnormality of the pneumatic tire based on a second corrected air pressure that is the air pressure acquired at the second timing and corrected by the correction processing portion, and the first corrected air pressure acquired at the first timing closest to the second timing; and
a third output processing portion configured to, under a condition where the detection processing portion has detected the abnormality, output second notification information that includes an indication of that fact.

8. The tire air pressure management system according to claim 7, wherein
the detection processing portion detects the abnormality under a condition where a decrease speed of the air pressure that is acquired based on the first corrected air pressure and the second corrected air pressure, exceeds a predetermined second threshold.

9. The tire air pressure management system according to claim 8, wherein
the second notification information includes:
degree information that indicates a degree of the abnormality that is based on a difference between the decrease speed and the second threshold; and
a message that tire replacement is necessary.

10. The tire air pressure management system according to claim 9, wherein
the third output processing portion outputs, together with the second notification information, either or both of size information of the pneumatic tire and type information of each of the pneumatic tires.

11. The tire air pressure management system according to claim 1, further comprising:
a the detector installed at each of the pneumatic tires and configured to detect the air pressure and the air temperature of the corresopnding pneumatic tire; and
a communication apparatus provided at the office and configured to communicate with the detector that is present in the predetermined specific area, wherein
the acquisition processing portion determines whether or not the vehicle has stopped in the predetermined specific area, based on whether or not a communication by the communication apparatus with the detector has been established,
wherein communication between the communication apparatus and the one or more processors is according to a communication standard having a range and/or bandwidth greater than that of the wireless communication standard associated with the detection data wirelessly output from the detector for each of the pneumatic tire.

12. A tire air pressure management method performed by one or more processors included in a tire air pressure management system, the tire air pressure management method comprising:
a determining step of determining whether a vehicle has entered a predetermined specific area and is stopped;
an acquisition step of acquiring an air pressure inside a pneumatic tire attached to the vehicle, and an air temperature inside the pneumatic tire, based on detection data wirelessly output from a detector associated with the pneumatic tire according to a wireless communication standard, the detection data including air pressure information for the pneumatic tire, air temperature information for the pneumatic tire. and detector identification information for the detector, under a condition where the determining step determines that the vehicle has entered the predetermined specific area and stopped;
a correction step of correcting the air pressure that has been acquired in the acquisition step together with the air temperature, based on a difference between the air temperature and a predetermined reference temperature; and
an output step of outputting, on a display, determination information that is generated based on the air pressure after correction in the correction step and is used to determine whether or not the pneumatic tire needs air pressure adjustment, wherein the vehicle is a rental vehicle that is rented out to a predetermined user, the predetermined specific area is a premise of an office where the rental vehicle is returned, the predetermined specific area is based on a range associated with receipt of the detection data that is wirelessly output from the detectors in the pneumatic tires according to the wireless communication standard, in the acquisition step, the air pressure and the air temperature are acquired at a first timing under a condition where the determining step determines that the vehicle has stopped in the predetermined specific area, p1 with the vehicle in the predetermined specific area, the step of correcting the air pressure is performed under the condition where the step of determining determines that the vehicle is in the predetermined specific area and has stopped. and p1 the step of outputting on the display the determination information is based on a first corrected air pressure that is the air pressure acquired at the first timing and corrected by the correction step.

13. The method according to claim 12, further comprising determining whether or not each of the pneumatic tires needs air pressure adjustment after the correction step.

* * * * *